Feb. 20, 1951 H. L. KRAEFT ET AL 2,542,538
APPARATUS FOR ASSEMBLING BICYCLE FRAMES
Filed Aug. 18, 1945 15 Sheets-Sheet 1
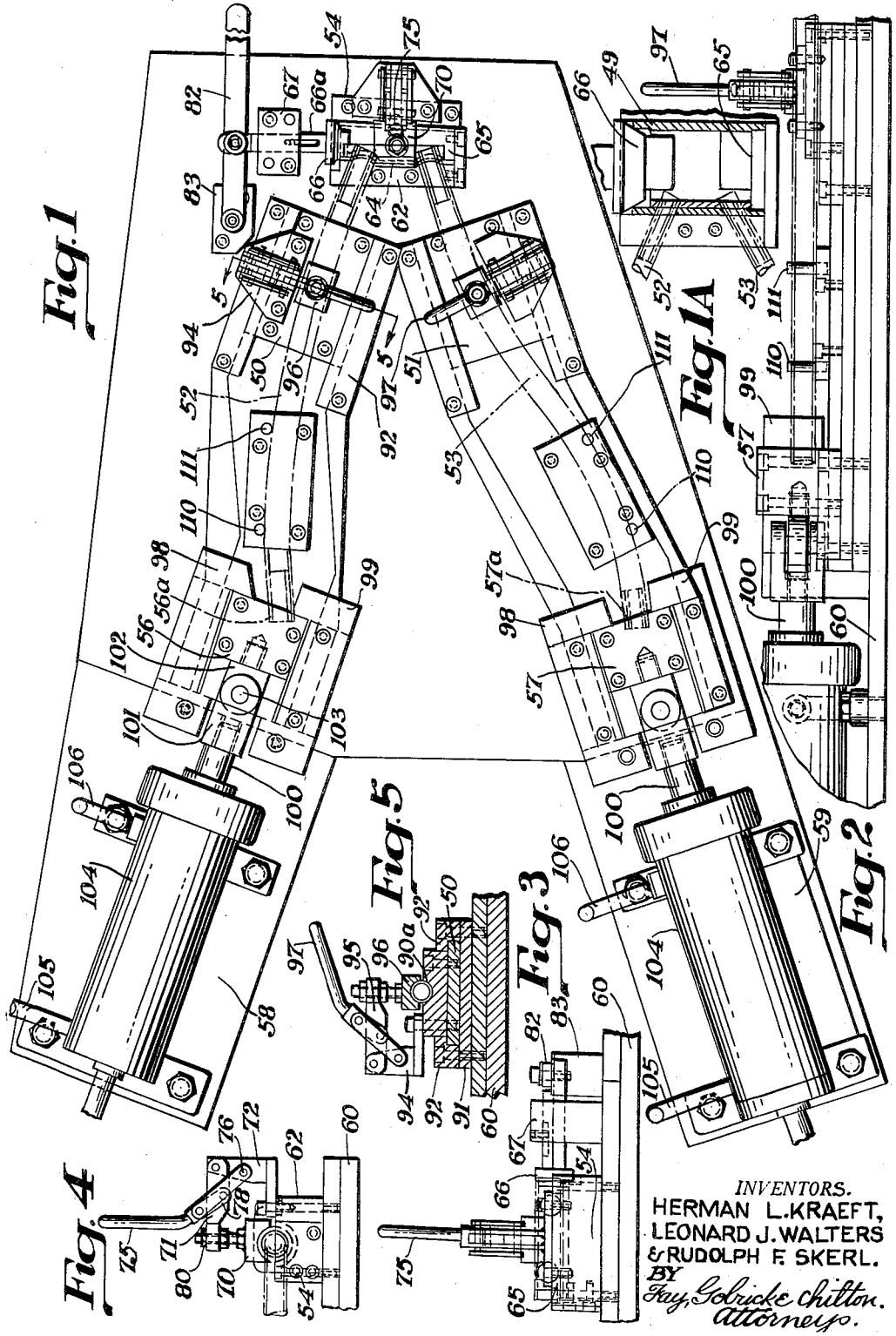
INVENTORS.
HERMAN L. KRAEFT,
LEONARD J. WALTERS
& RUDOLPH F. SKERL.
BY
Fay, Gobricke Chitton.
Attorneys.

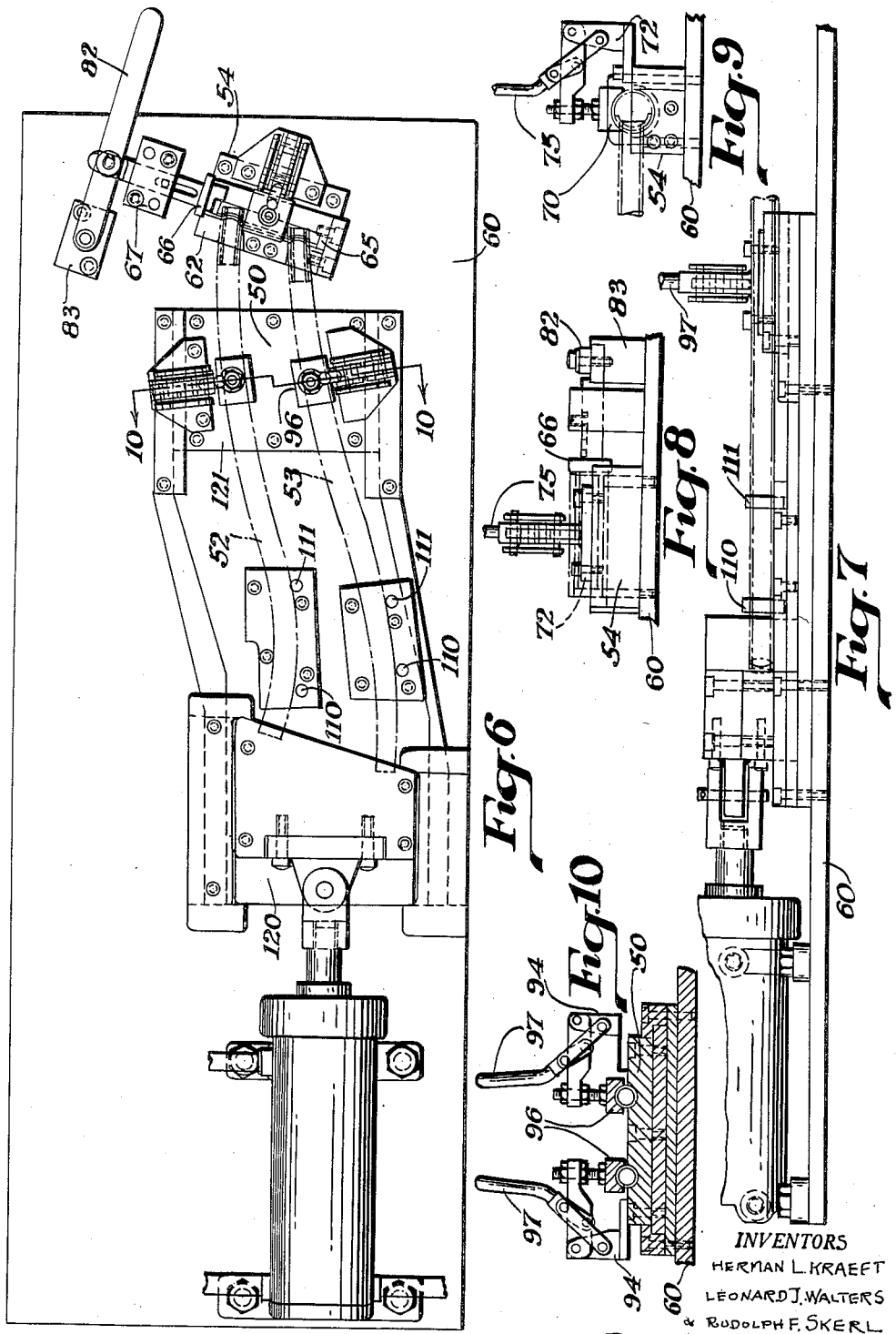

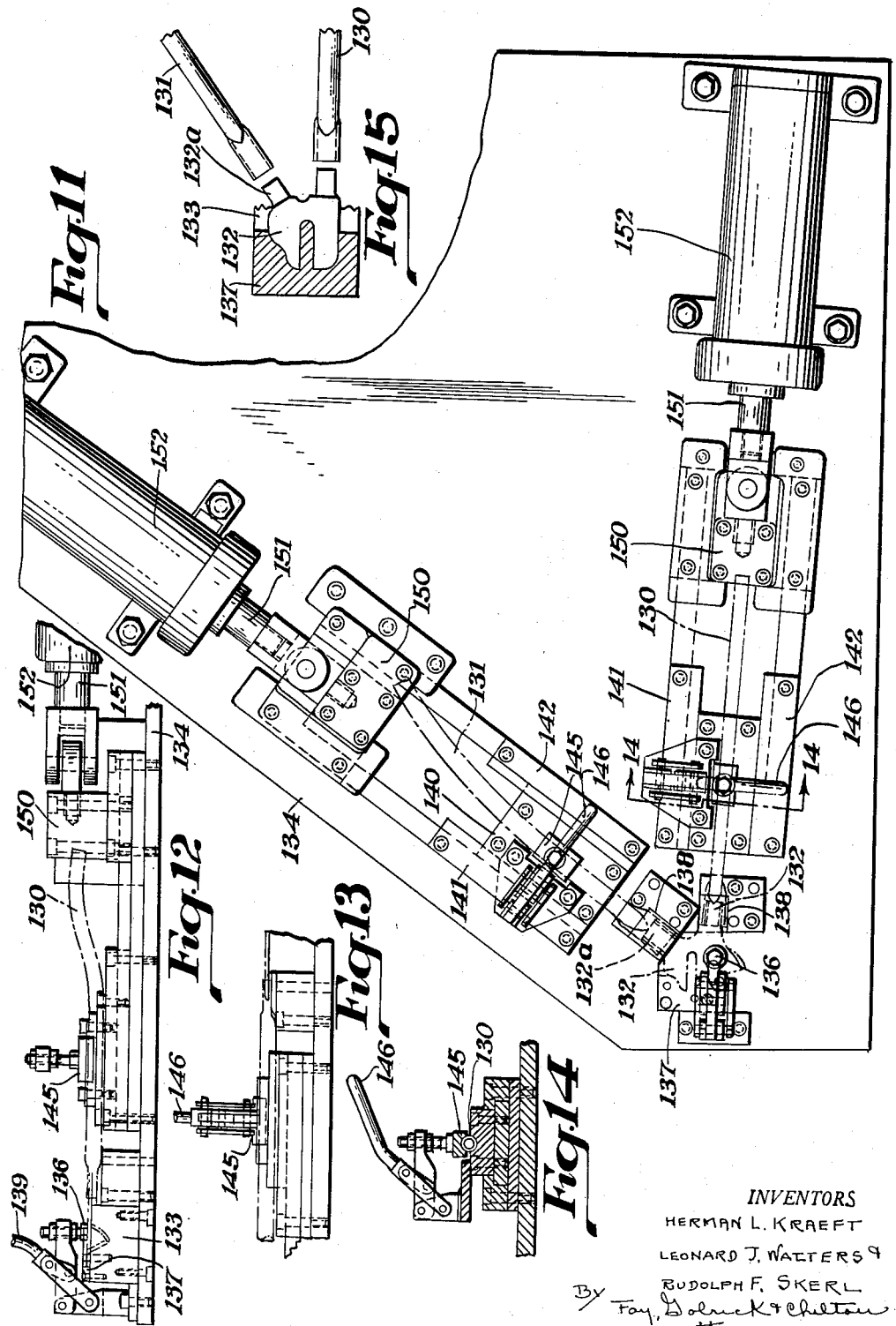

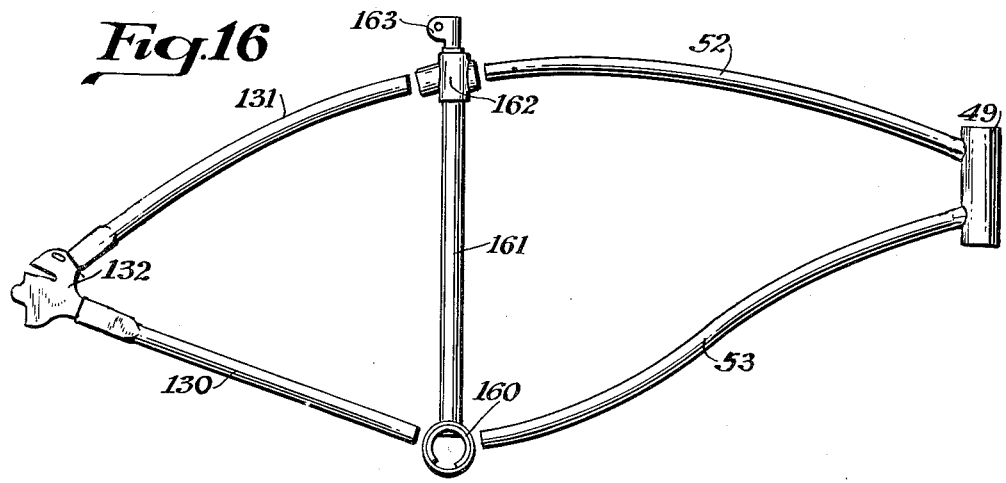
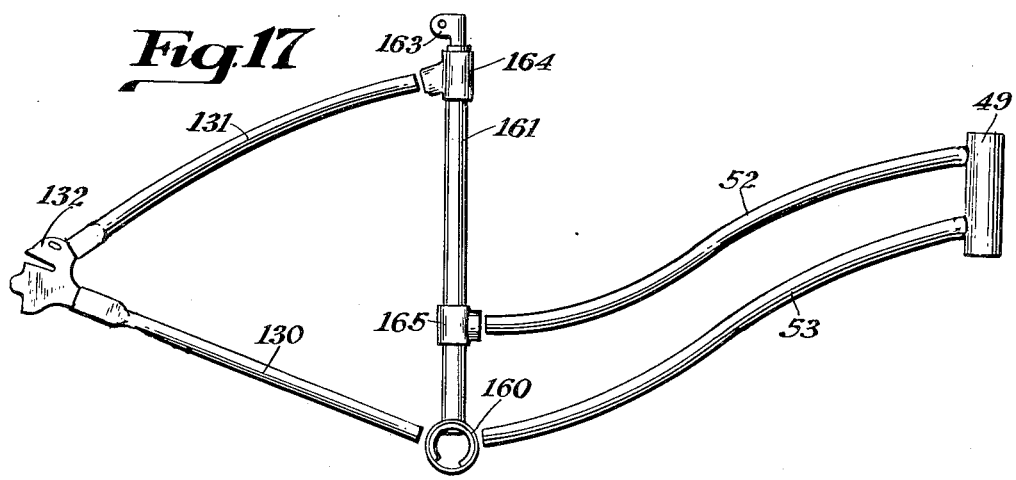

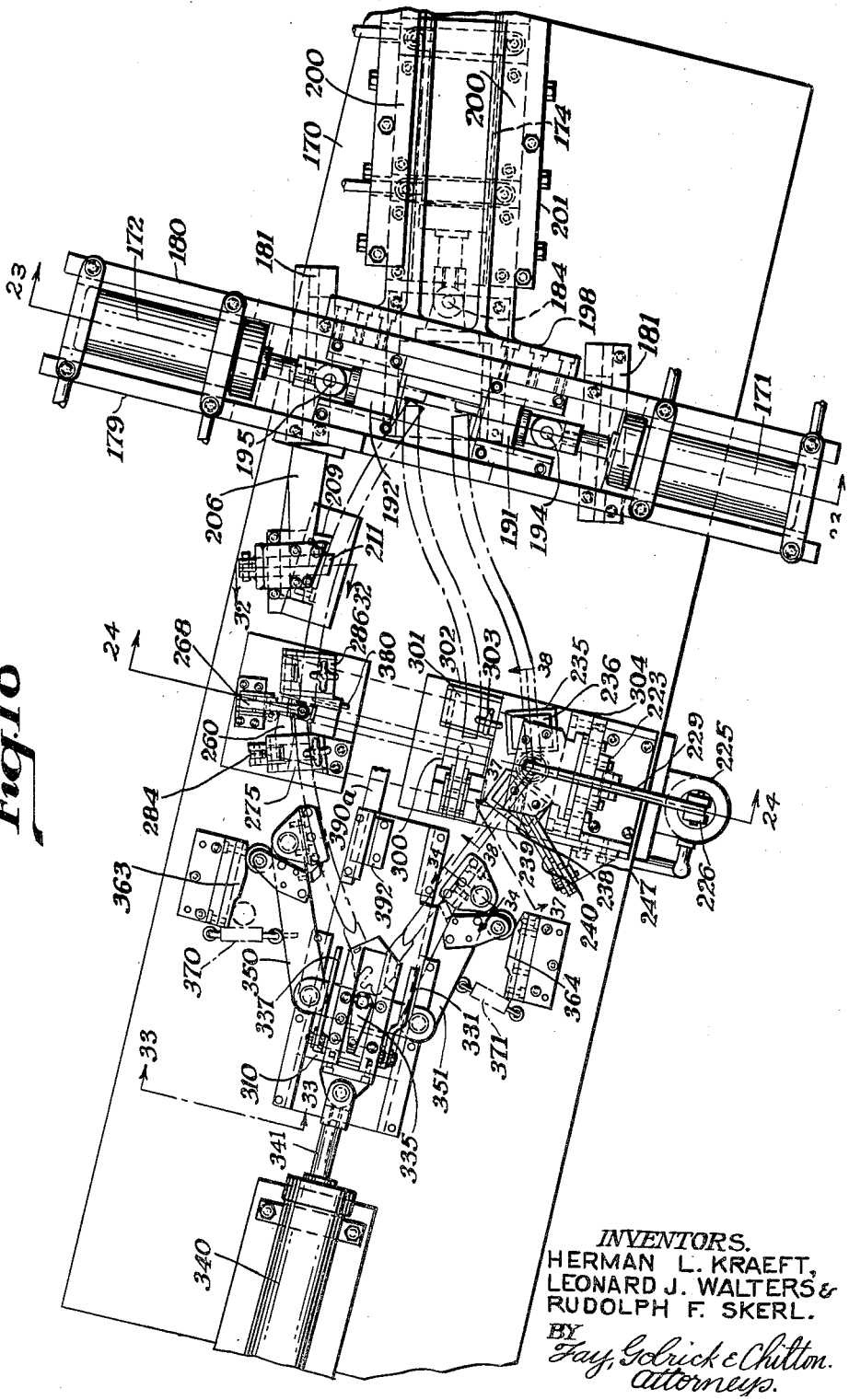

Feb. 20, 1951    H. L. KRAEFT ET AL    2,542,538
APPARATUS FOR ASSEMBLING BICYCLE FRAMES
Filed Aug. 18, 1945    15 Sheets-Sheet 6
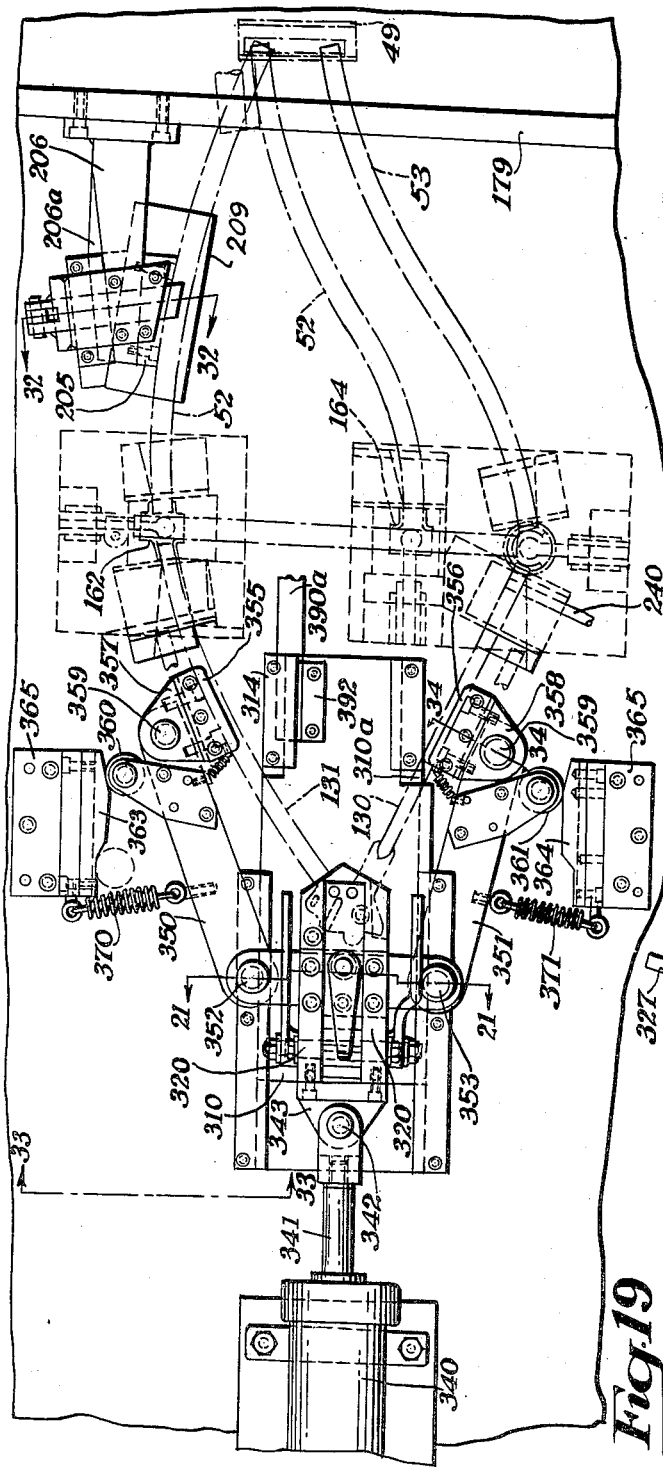
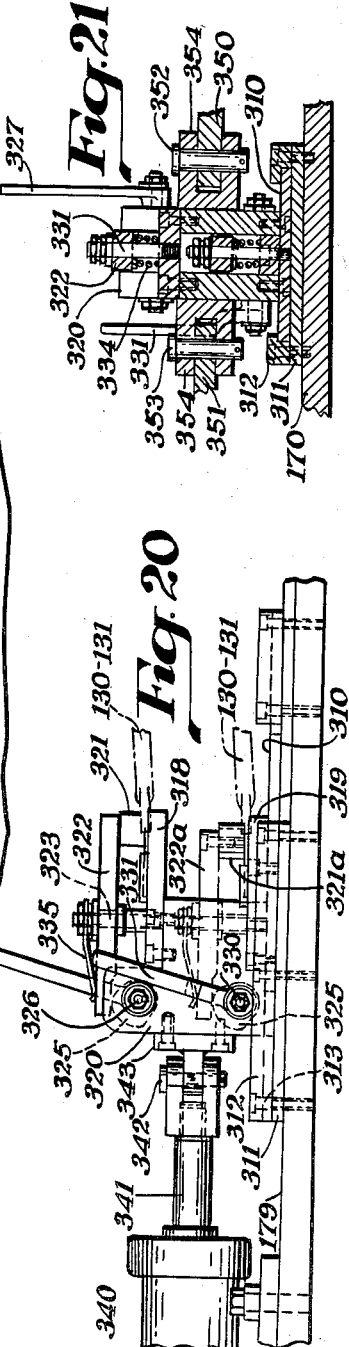
INVENTORS.
HERMAN L. KRAEFT,
LEONARD J. WALTERS &
RUDOLPH F. SKERL.
BY Fay, Golrick & Chilton.
Attorneys.

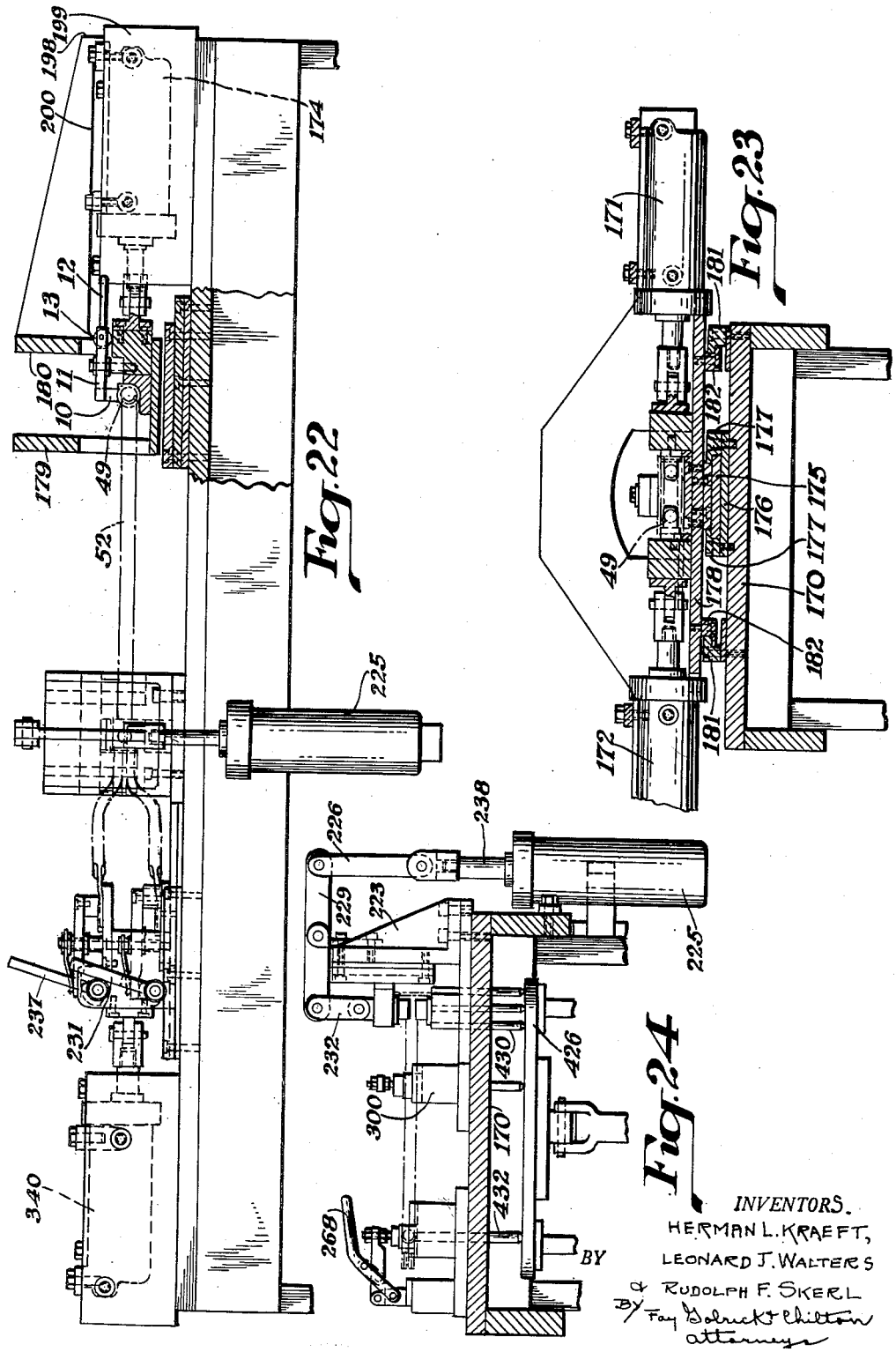

Feb. 20, 1951  H. L. KRAEFT ET AL  2,542,538
APPARATUS FOR ASSEMBLING BICYCLE FRAMES
Filed Aug. 18, 1945  15 Sheets-Sheet 8
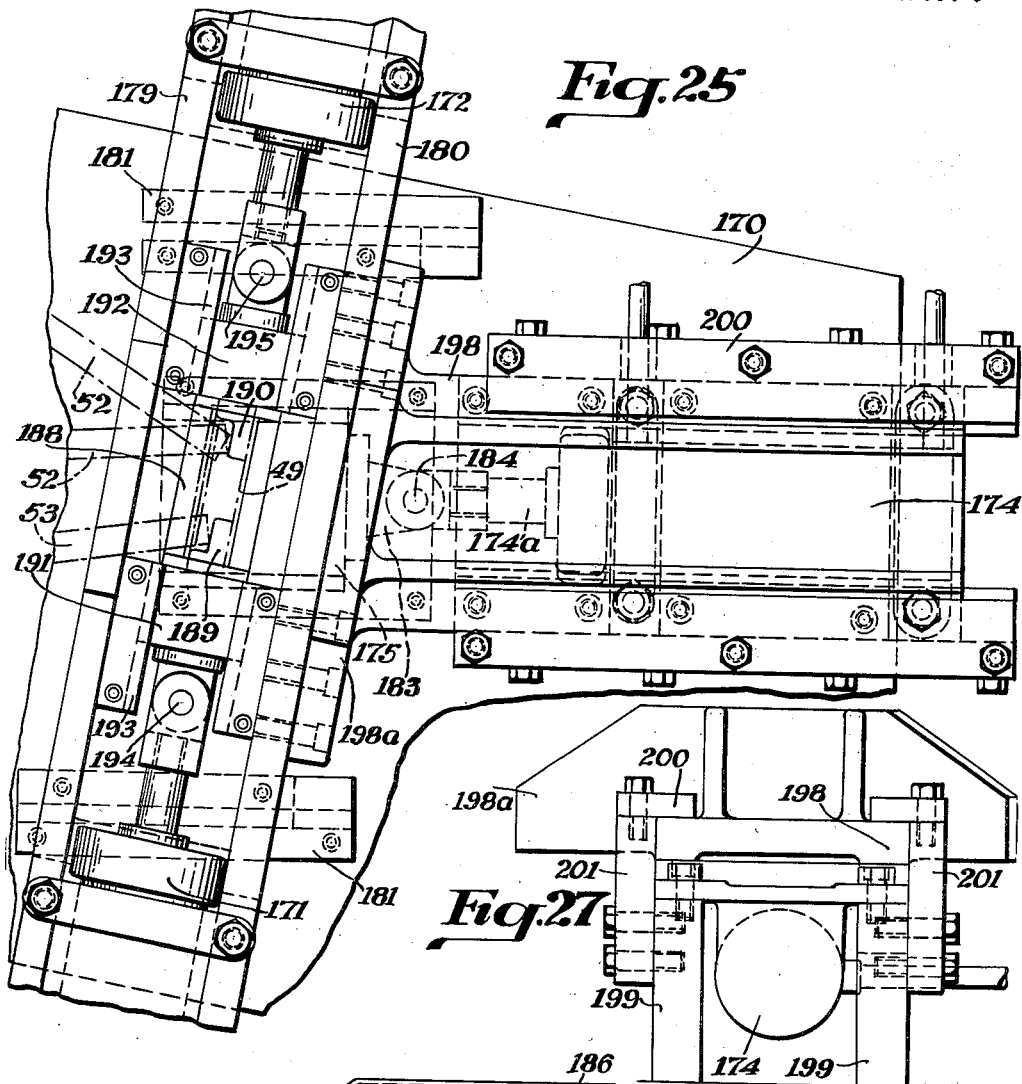
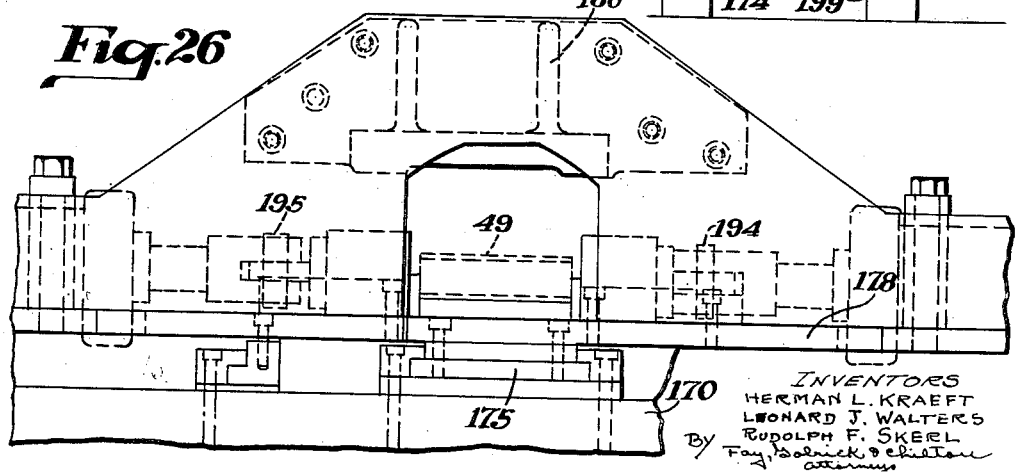

Feb. 20, 1951 H. L. KRAEFT ET AL 2,542,538
APPARATUS FOR ASSEMBLING BICYCLE FRAMES
Filed Aug. 18, 1945 15 Sheets-Sheet 9
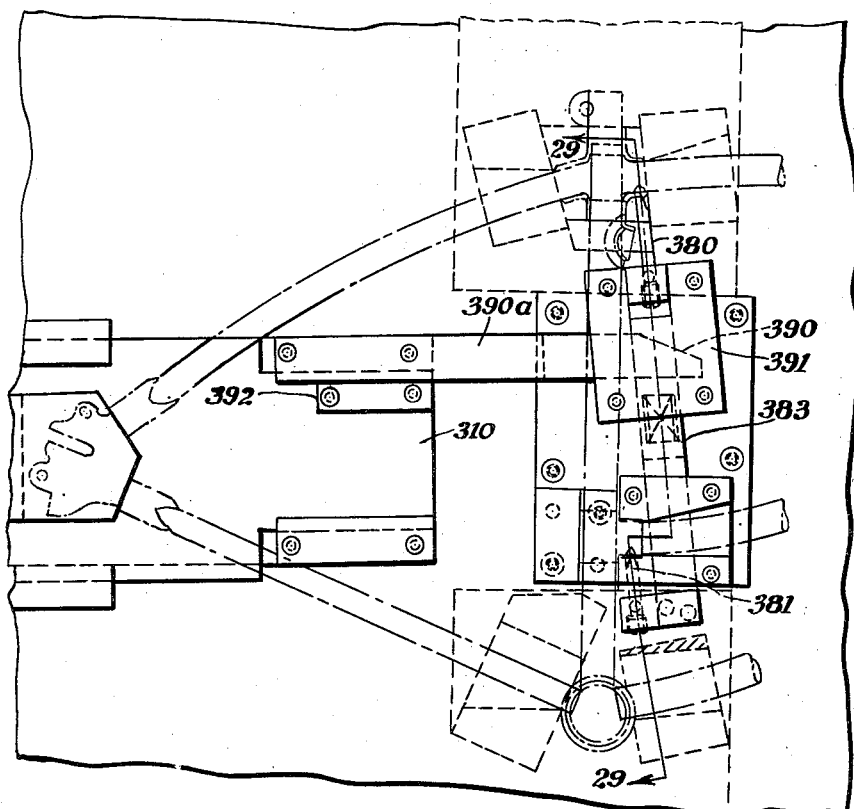
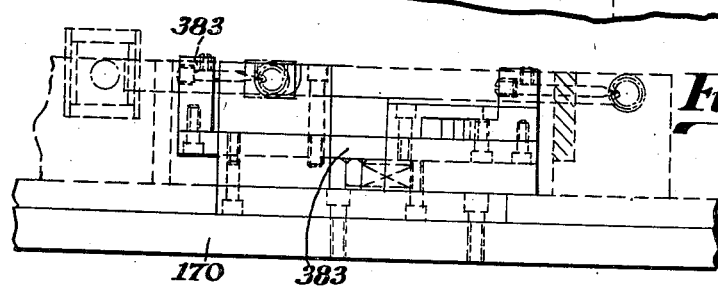
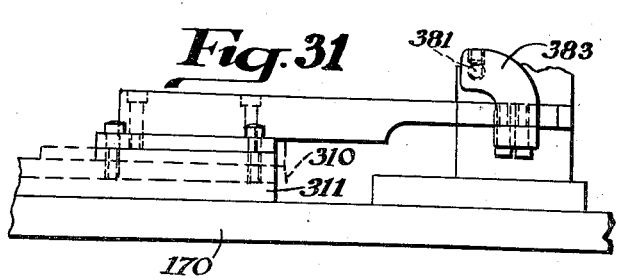
INVENTORS.
HERMAN L. KRAEFT,
LEONARD J. WALTERS &
RUDOLPH F. SKERL.
BY Fay, Sobrick & Chilton.
Attorneys.

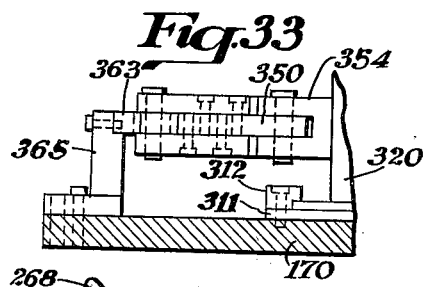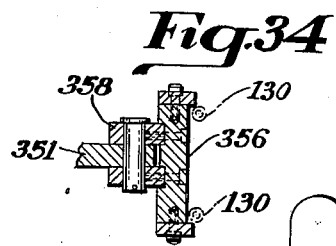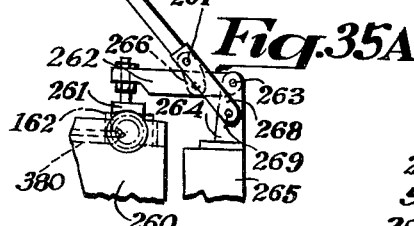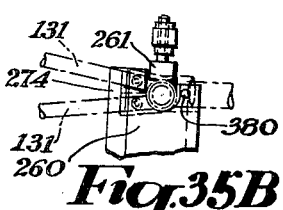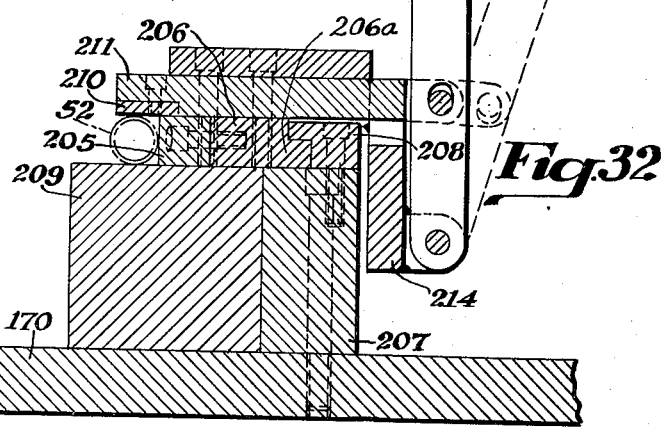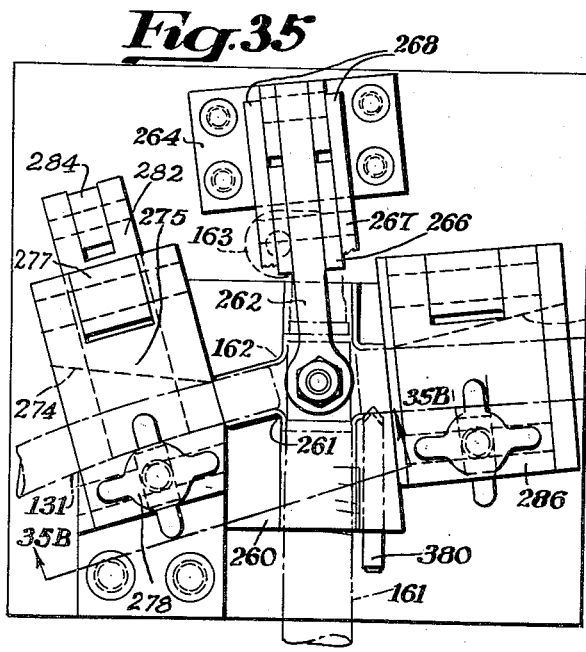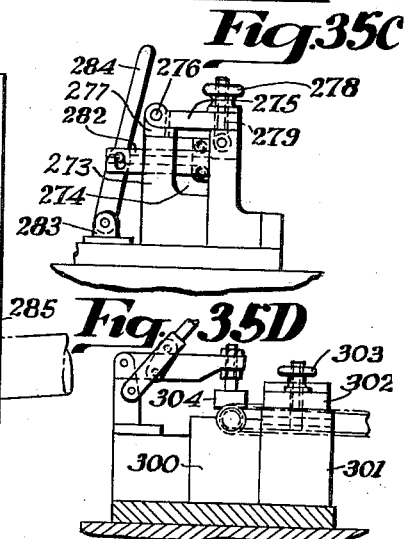

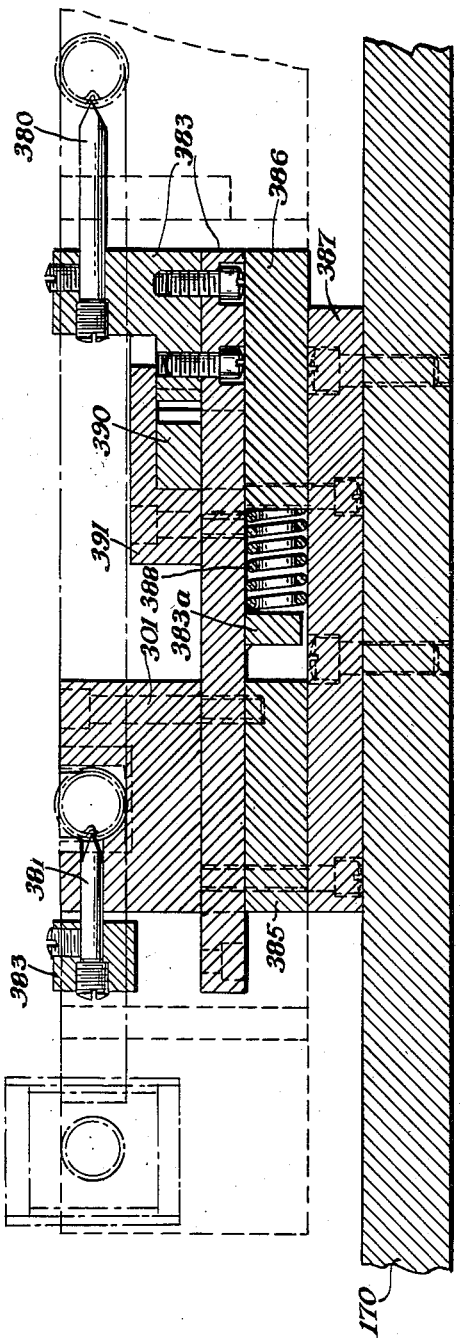
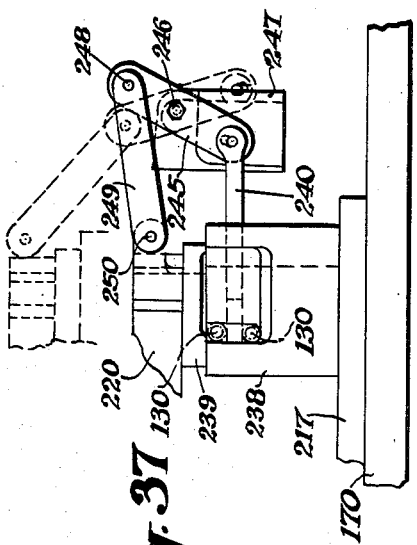

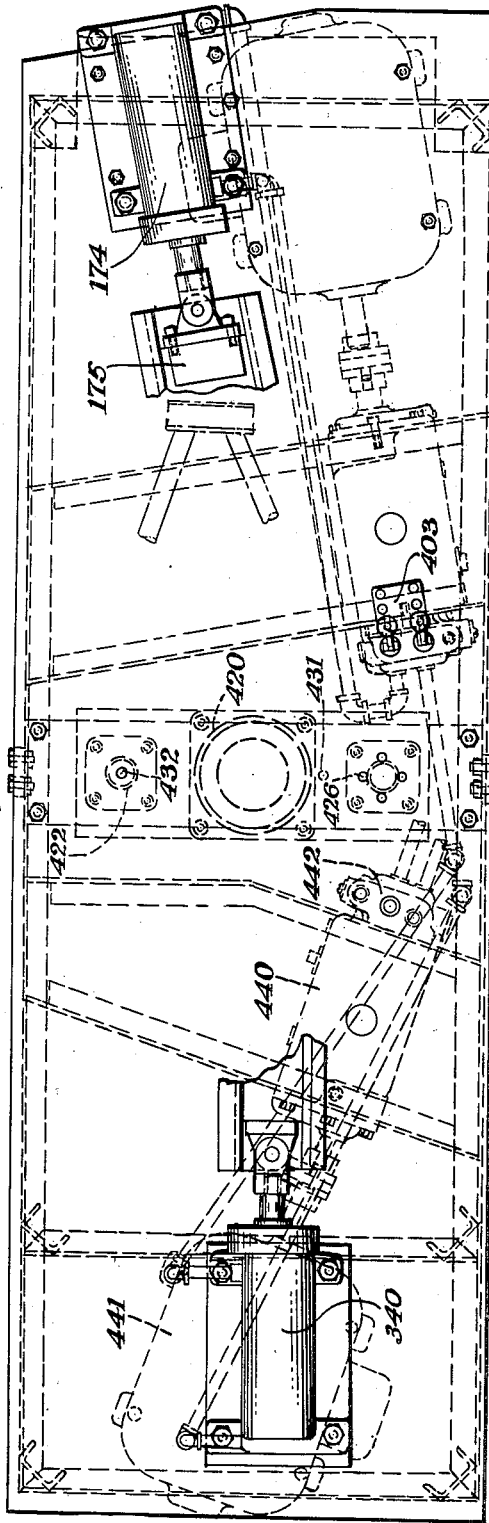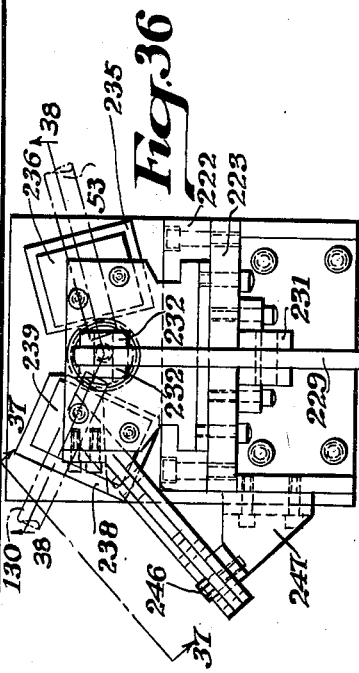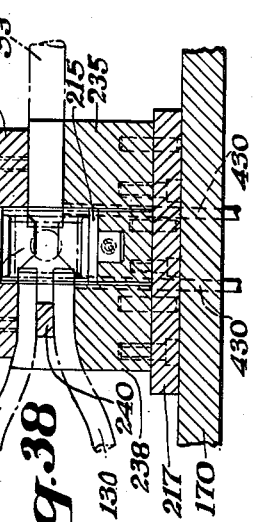

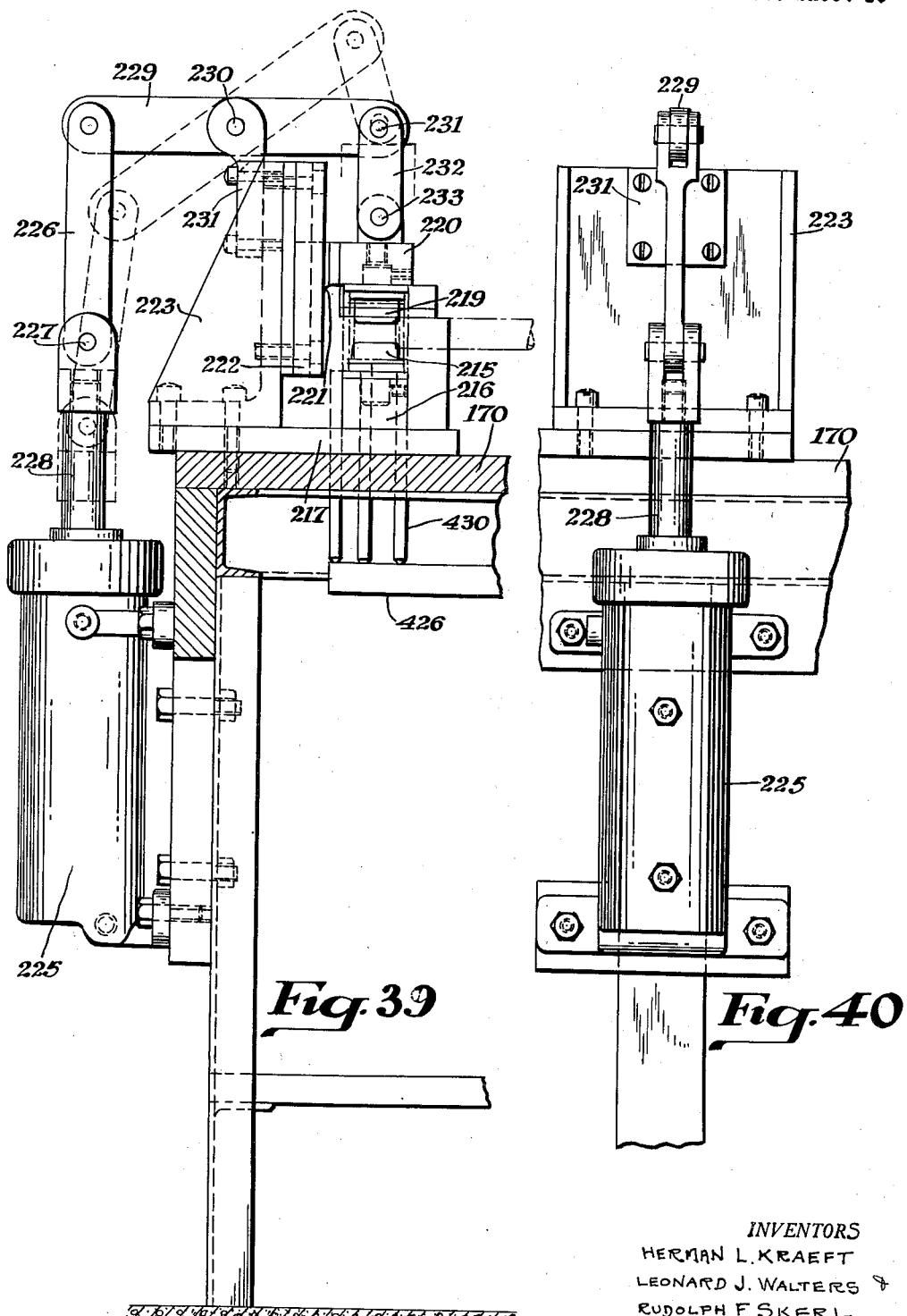

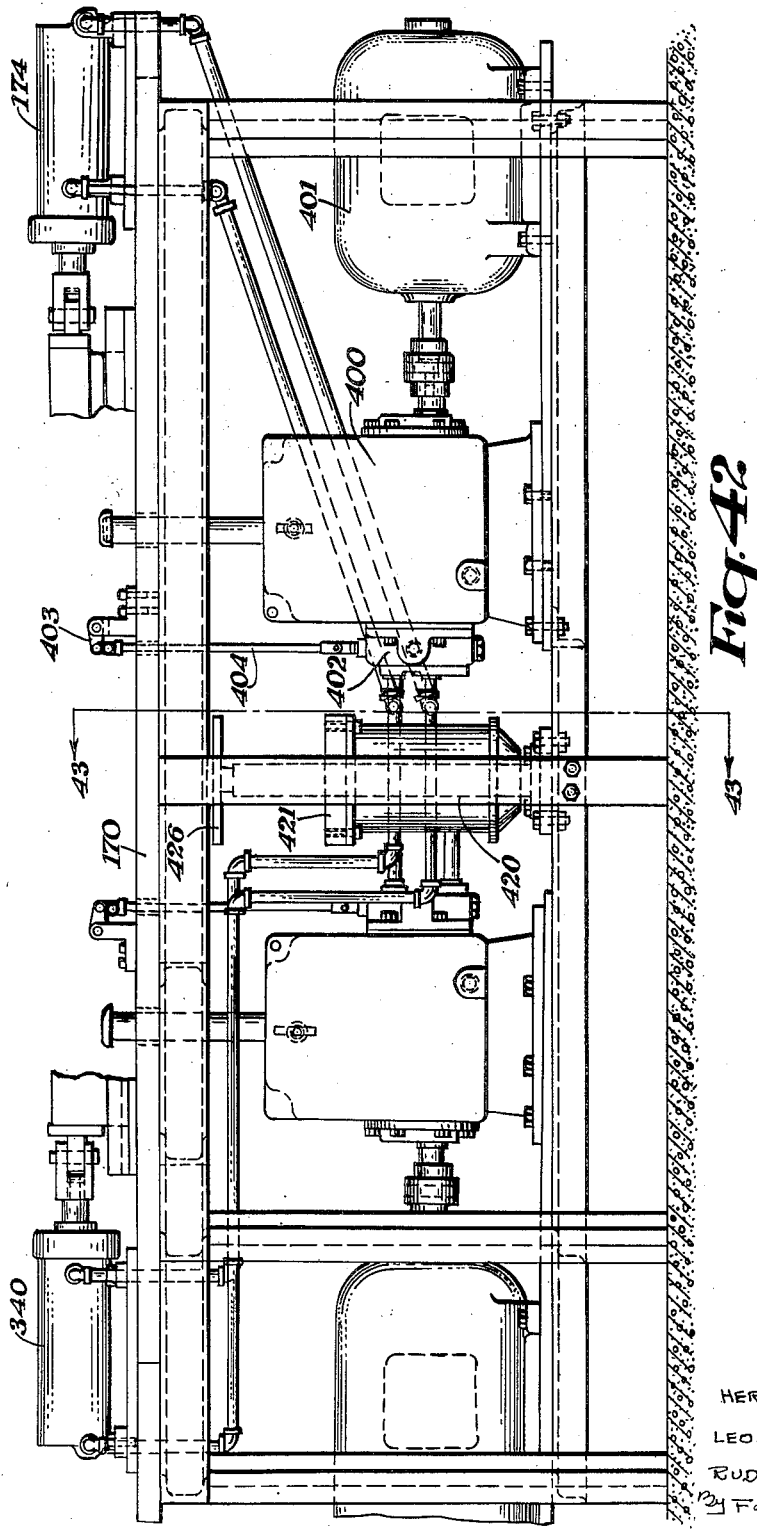

Feb. 20, 1951     H. L. KRAEFT ET AL     2,542,538
APPARATUS FOR ASSEMBLING BICYCLE FRAMES

Filed Aug. 18, 1945     15 Sheets-Sheet 15

INVENTORS
HERMAN L. KRAEFT
LEONARD J. WALTERS
RUDOLPH F. SKERL
By Fay, Dolnick & Chilton
attorneys Patented Feb. 20, 1951

2,542,538

UNITED STATES PATENT OFFICE 2,542,538

APPARATUS FOR ASSEMBLING BICYCLE FRAMES

Herman L. Kraeft, Cleveland Heights, Leonard J. Walters, Shaker Heights, and Rudolph F. Skerl, Euclid, Ohio, assignors to The Murray-Ohio Manufacturing Company, Cleveland, Ohio, a corporation of Ohio Application August 18, 1945, Serial No. 611,286

5 Claims. (Cl. 29—252)

1

This invention is directed to the manufacture of tubular frame structures such as velocipede frames and the particular disclosure herein set forth illustrates the novel method and the novel apparatus adapted to the manufacture of bicycle frames.

In the prior Kraeft and Walters application Serial No. 513,163 now Patent No. 2,435,448 a bicycle frame is disclosed having such structural characteristics as to make feasible the pre-assembling of all of the elements or parts of the frame whereby a simultaneous copper brazing of all of the frame parts, including reinforcements, could be effected in a highly advantageous manner by heating the entire frame to a copper brazing temperature in a non-oxidizing environment. This resulted in the production of a strong frame of such external neatness and cleanness as to obviate the labor of trimming, grinding and filing of flashings or drippings unavoidably incurred in welding and brazing methods heretofore practiced in the velocipede frame manufacturing art. In said application the preconditioning of the pre-assembled frame joints to withstand the expansion of the frame parts when raised to a copper brazing temperature of from 2025° to 2080° F. without a resulting disruption of accurate relationship of the parts at the joints comprised a salient feature of the disclosed method.

Generally the method comprised effecting a close fitting of the parts at the joints and the preliminary maintenance of the joints by a temporary locking of the joined tubes through the use of spot welds or the like that would hold the assembled relationship of the inserted ends of the smaller tubes which had been close fitted into openings formed in the larger tubes. While the ultimate purpose was fulfilled, the joint spotting in some instances was awkward and uncertain in that occasionally spot weld failures would develop during the high temperature period of the brazing with a resulting slippage at one or more of the joints. Hence a certain percentage of the completed frames would have to be discarded since such a completed frame could not be salvaged.

The general object of the present invention is to simplify further and to improve the mode of assembly and the temporary bonding of the joints of the assembly whereby the entire frame assembly will remain so thoroughly locked when the entire frame is heated to approximately 2000° F., that practically no subsequent straightening of the frame elements is required.

Another object is to provide a pressure mode

2 of joint forming preparatory to a copper brazing operation which eliminates the general need of a tube locking or a securing medium at each joint to maintain the inter-relationship of the joined tube members when expansion thereof takes place during the brazing operation.

A further object of the present invention is the provision of a novel method of simultaneously effecting a pressure assembly of several sub-assemblies comprising a tubular velocipede frame in such manner as to avoid the creation of troublesome localized stresses in the tubular elements which would cause warping in a subsequent simultaneous brazing operation.

A further object of the present invention is to provide a mode of effecting a press fitted pre-assembly of the various tubular elements comprising a bicycle frame whereby the over-all accuracy of the pre-assembly will be maintained without the use of heat consuming fixtures during a general brazing operation in which the entire frame is heated to temperatures of from 2025° to 2080° F. while standing in an upright position.

A further object is the provision of novel mechanism for carrying out various steps of the method disclosed.

The present invention contemplates the use of an order of assembly of the various elements and parts comprising the velocipede frame whereby very substantial pressures can be utilized to effect very tight press fits of from .005 to .015. We have determined that severe press fits will eliminate all danger of a spreading or creeping of the frame parts relative to each other when heated throughout during a brazing temperature of over 2000° F. and without interfering with the capillary migration of the liquid copper. The pressures required to force the smaller tube ends into the openings formed in the walls of the larger tubular elements are quite substantial and, due to the fact that most of the reach bars comprising the frame are curvilinear in shape, the mode of supporting and conditioning the elements to receive such press fitting forces and the mode of force application is such that proper alignment of the interfitting press fitted parts can be maintained during this operation. The creation of internal stresses and strains which would become manifest in distortions and bad joints when released during the overall high temperature brazing operation is avoided.

Our method, which is here disclosed as applied to making bicycle frame, accordingly comprises the formation of four sub-assemblies of the elements which consist of the bicycle frame, to-wit; the double walled head or front fork bearing housing tube having two non-parallel openings formed therein and into which openings ends of curved upper and lower reach bars have been press fitted; the center or seat post mast tube assembly formed of a double walled hanger housing tube having four openings of different diameters formed in the double wall thereof with the center tube lower end press fitted into one of the openings and a branched seat post cluster member press fitting upon the outer surface of the center mast tube in a desired position (dependent upon whether a girl's or boy's bicycle frame is to be produced); and two rear fork sub-assemblies, each consisting of an upper rear fork tubular member and a lower rear fork tubular member of curvilinear shape with one end of each tube flattened to be press fitted or otherwise secured to lugs or branches formed on rear axle plates or yokes. The various smaller tubes have reinforcing inserts assembled within the end portions thereof. In the drawings we have shown apparatus for effecting these pre-assemblies and will now refer thereto in the order of the above listed sub-assemblies.

In said annexed drawings:

Fig. 1 is a plan view of a mechanism for effecting the pre-assembly of the head or front bearing tube, the upper and lower reach bars of the frame;

Fig. 1A is an enlarged cross-sectional view taken through the center of the front tube housing and front upper and lower rear ends to illustrate the relationship of gauging means acting on these frame parts;

Fig. 2 is a side elevation of part of the mechanism shown in Fig. 1;

Fig. 3 is an end elevation of the head tube clamping mechanism;

Fig. 4 is a side elevation of the clamping mechanism shown in Fig. 3;

Fig. 5 is a fragmentary cross-sectional elevation taken substantially along the line 5—5 in Fig. 1;

Fig. 6 is a plan view of an adaptation shown in Fig. 1 in the pre-assembly of the front housing or bearing tube and the front upper and lower reach bars of a girl's bicycle frame;

Fig. 7 is a side elevational view of part of the mechanism shown in Fig. 6;

Fig. 8 is an end elevation of the head or front bearing tube clamping mechanism;

Fig. 9 is a side elevational view of the front housing or bearing tube clamping mechanism;

Fig. 10 is a cross-sectional view taken through a clamping slide and tube guiding mechanism taken along the line 10—10 in Fig. 6;

Fig. 11 is a top plan view of mechanism for effecting the pre-assembly of a rear axle plate and an upper and a lower rear fork tube, there being two of such mechanisms utilized for effecting right and left-hand pre-assemblies;

Fig. 12 is a side elevation of the mechanism shown in Fig. 11;

Fig. 13 is an end elevation of part of the mechanism as viewed from the left side of Fig. 11;

Fig. 14 is a cross-sectional elevation taken substantially along the line 14—14 of Fig. 11 showing the structure of one of the tube clamping and guiding slide mechanisms;

Fig. 15 is a diagrammatic representation of the relationship of the rear fork tubular members and a rear axle plate before the press fitting pre-assembly thereof by the mechanism shown in Fig. 11;

Fig. 16 is a diagrammatic representation of four pre-assemblies comprising a boy's type bicycle frame;

Fig. 17 is a diagrammatic representation of four pre-assemblies comprising a girl's type bicycle frame;

Fig. 18 is a top plan view of a machine for effecting the final assembly of the four pre-assemblies comprising the bicycle frames and as adapted to effecting such final assemblies of both boy's and girl's type of bicycle frames;

Fig. 19 is a partial plan view, on an enlarged scale, of the mechanism shown in Fig. 18 to emphasize the mechanism for clamping, guiding and press fitting the two pairs of rear frame assemblies, each consisting of an upper fork tube, a lower fork tube and rear axle plate, to the center mast pre-assembly;

Fig. 20 is a partial side elevation of the mechanism shown in Fig. 19;

Fig. 21 is a cross-sectional elevation taken substantially along the line 21—21 of Fig. 19 through a sliding clamp fixture which carries the two rear axle plates and attached tubes in properly spaced relation;

Fig. 22 is a side elevation of the final assembly machine shown in Fig. 18;

Fig. 23 is a cross-sectional elevation taken through the head tube or front bearing housing tube gauging and clamping mechanism and substantially along the line 23—23 of Fig. 18;

Fig. 24 is a cross-sectional elevation taken substantially along the line 24—24 of Fig. 18 through the center mast assembly gauging and clamping mechanism;

Figure 44:
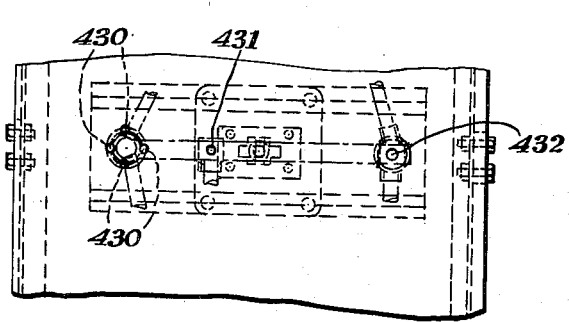
Figure 43:
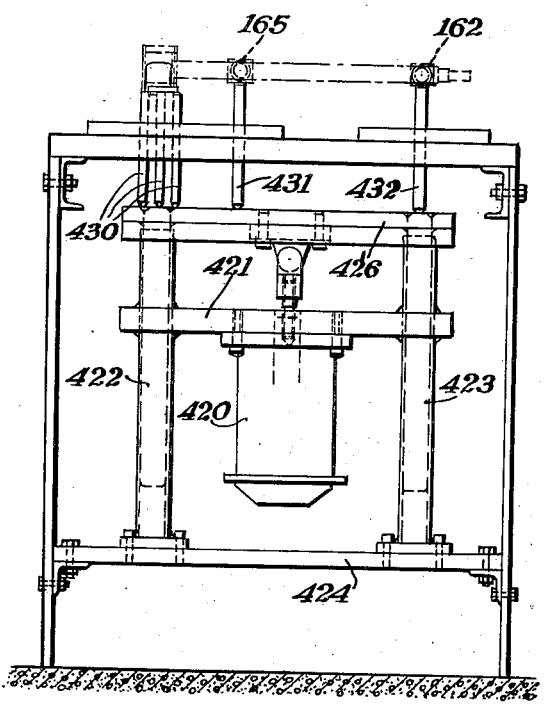

Fig. 25 comprises an enlargement of the front housing gauging and clamping mechanism shown in Fig. 18;

Fig. 26 is an elevational view of the gauging, clamping and slide mechanism as viewed from the left in Figs. 18 and 25;

Fig. 27 is a partial rear view of the structure shown in Fig. 26;

Fig. 28 is an enlarged plan view of part of the mechanism shown in Fig. 18 and comprising nibbing means for locking the upper front reach bar to the center mast cluster by a metal indenting operation and as adapted to such locking for both boys' and girls' type frames;

Fig. 29 is an enlarged cross-sectional elevation taken substantially along the line 29—29 of Fig. 28;

Fig. 30 is an elevational view similar to Fig. 29 on a smaller scale;

Fig. 31 is a side elevational view of a sliding cam mechanism for effecting actuation of the nibbing mechanism shown in Figs. 28, 29 and 30;

Fig. 32 is a cross-sectional elevation of the upper front reach bar or tube gauging and actuating means and taken substantially along the line 32—32 of Figs. 18 and 19;

Fig. 33 is a fragmentary cross-sectional view taken substantially along the line 33—33 of Fig. 19;

Fig. 34 is a fragmentary cross-sectional view taken substantially along the line 34—34 of Fig. 19;

Fig. 35 is an enlarged plan view of the seat post or center mast cluster clamping means and tubular guiding means for guiding the ends of the upper rear fork tubes and the rear ends of the upper reach bar tubes during the press fitting of the same to the center mast cluster assembly;

Fig. 35A is a side elevation of the center mast clamping mechanism as viewed from the right of Fig. 35;

Fig. 35B is an elevation of the rear upper fork tube guiding means as viewed from the position indicated by the line 35B—35B in Fig. 35;

Fig. 35C is a side elevational view of the means shown in Fig. 35B as viewed from the left of Fig. 35;

Fig. 35D is an elevational view of the girls' type cluster clamping and tube guiding means as viewed from a position indicated by the line 35D—35D in Fig. 18;

Fig. 36 is a plan view of the hanger housing gauging and clamping means shown in Fig. 18, but enlarged for the purpose of disclosure;

Fig. 37 is an elevational view of a part of the mechanism shown in Fig. 36 and as viewed from the direction indicated by the line 37—37 in Fig. 36;

Fig. 38 is a cross-sectional view of the hanger housing gauging and clamping means taken substantially along the irregular line 38—38 of Fig. 36;

Figs. 39 and 40 are enlarged elevational views of the hanger housing clamping mechanism to show the means for effecting the operation thereof;

Fig. 41 is a top plan view of the mechanism shown in Fig. 18 to illustrate the location of the hydraulic means for operating the various fixtures comprising the assembling machine;

Fig. 42 is a side elevational view of the hydraulic mechanism indicated in Fig. 41;

Fig. 43 is a cross-sectional elevation of the machine taken substantially along the line 43—43 of Fig. 42 to illustrate a knockout mechanism for extracting or elevating the completely assembled frame out of the machine; and Fig. 44 is a fragmentary end view of the knockout mechanism shown in Fig. 43.

In Figs. 1 to 5 inclusive, the apparatus for effecting the front sub-assembly of a boy's type frame is shown, while in Figs. 6 to 10 inclusive, a similar apparatus for effecting the front sub-assembly of a girl's type frame is shown. The apparatus of Figs. 1 to 5 inclusive, comprises primarily shiftable tube clamps or carriers 50 and 51 for clampingly engaging the front upper and lower reach bars 52 and 53 respectively, in position indicated by dot and dash lines in Fig. 1; a head tube positioning and clamping mechanism, generally indicated by the reference numeral 54; and two pressure slides 56 and 57, preferably hydraulically operated by pressure units, generally indicated by the reference numerals 58 and 59, respectively. These various mechanisms are mounted upon base plates supported on the top flat side of a machine bed or plate 60. These associated mechanisms are on the top of the bed so that the curving center lines of the preformed reach bars 52 and 53 and the head tube center line will be disposed in a horizontal plane when placed in the apparatus for assembly. The head positioning and clamping mechanism comprises a clamping anvil and gauging block 62 which is hollowed out to form a half cylinder cradle for the reception of head tube 64. This block also is provided with two guiding channels for guiding the ends of the reach bars to openings in the head tube as will be described. Secured to one end of the block 62 is a gauging plug 65 which closes one end of the trough or cradle of the block 62 and serves as a gauge stop for one end of the head tube. Disposed at the opposite end of the block 62 is a shiftable gauging plug 66 supported by a bracket 67 to engage the opposite end of the head tube. The gauging plug 66 may be operated by a lever member 82 pivotally connected to an extended end of the plug shank 66a, the lever 82 being pivotally supported by a block 83 fixed to the bed of the machine. These gauging members 65 and 66 may be shaped to fit into counterbores formed in the ends of the head tube 49 and serve, with a head tube clamping means associated therewith, to hold the head tube firmly. A head tube clamping member 70 is adjustably supported on a swingable arm 71, pivotally supported by a bracket member 72 secured to the upper face of the cradle block 62. A manually operable lever 75 is pivotally connected to the bracket 72 at 76. An over center link 78 pivotally connects the lever 75 with the clamping arm 71. Adjustment of the screw connection 80, existing between the clamping member 70 and lever 71 affords a clamping adjustment whereby a locking action as well as the clamping action is effected by manual operation of the lever member 75.

The slidable clamping mechanisms 50, 51 are substantially the same in construction, but only one will be described. The slide member 50 comprises a positioning and clamping block 90 secured to the slide member 50 and held in slidable relation to a base plate 91 by slideways or gibs 92 bolted to the base member 91. The construction is such as to afford accurate endwise movement of the bars 50, 51 regardless of any lateral force components. Mounted upon the slidable cradle block 90 is a bracket structure 94 which pivotally supports a clamping arm 95 and from which depends an adjustable clamping block 96, the same being operable by lever member 97, as hereinbefore described with reference to the head clamping block 70. The clamping block 90 has a cradle formation 90a which conforms in shape to the cylindrical shape of the reach bar tube portion it is to engage.

The pressure exerting slides 56 and 57 are supported by slide construction supporting the slidable clamping blocks 90, but are limited in their pressure exerting movements by stop members 98 and 99. The slide members 56 and 57 have tube end abutting sockets 56a and 57a shaped to have pressure surfaces coincident with the tube end surfaces. The pressure slide members 56 and 57 may be operated in any desired manner, the means here shown comprising hydraulic pistons and cylinders. Thus, piston rods 100 are provided with bifurcated ends 101 which span eye lugs 102 secured to the slide ends and pin 103 forms the mechanical connection between the piston rods 100 and pressure slides 56—57. The rods 100 are operated by double acting piston members within the cylinder members 104, there being hydraulic connections 105 and 106 for effecting a controlled reciprocating movement of the slide members 56, 57. The cylinders 104 are secured to the bed member 60 of the machine at such elevation that a horizontal plane passing through the center lines of the two piston rods 100 will pass substantially through the horizontal curve center lines of the two reach bars 52 and 53 and the tube head 64.

It will be noted that we have provided gauge pins 110, 111 disposed to contact the exterior of the reach bar tubes in a generally longitudinal direction and along the curved portions thereof as the tubes are moved by the action of the pressure slides 56, 57.

The operation of this machine is as follows. A pre-formed double walled head tube is placed in the cradle of the gauging and clamping block 62 with one end abutting the gauging block 65 and with the center lines of the two non-parallel openings of the head member disposed in a horizontal plane and extending toward slide members 50, 51. The gauging plug 66 is then drawn into engagement with the opposite end of the head tube by operation of lever 82. This function of positioning members 65—66 is shown in cross-section in Fig. 1A. The clamping block 70 is swung into place to engage the central region of the side wall of the head tube and is there locked by operation of the lever member 75. The pressure slide members 56—57 are in retracted position toward the left in Fig. 1. The upper reach bar tube 52 and the lower reach bar tube 53 are then placed with the ends thereof in cavities 56a, 57a respectively, of the pressure slides 56 and 57 and the clamping blocks are brought to bear on the tubes after having been properly positioned, whereupon operation of the lever members 97 effect the clamping of the two reach bar tubes to the slide members 50, 51 respectively.

When hydraulic pressure is brought to bear upon the pressure slide members, 56—57 the tubes as well as the guiding slide members 50—51 are shifted toward the head tube and the ends of the reach bar tubes with inserts therein are guided by the channels in the block 62 and pressed with sufficient force into the openings of the head tube to form a press fit engagement therebetween. During this movement the pins 110—111 and the slides 50—51 serve to prevent any lateral distortion of the tubes 52—53. The lever members 97 are then swung into unclamping position whereupon the pressure slide members 56—57 can be retracted by operating the hydraulic control for the piston-cylinder mechanisms. It will be noted that during such pressure operation and while the pins 110 and 111 serve as lateral supports to prevent lateral distortion of the tubes, due to their outwardly bowed shape, the tube ends being press fitted in the head tube openings, are moved in a direction which is substantially coincident with the center lines of the openings in the head tube wall.

It will also be noted that the angular disposition of the center lines of the piston rods 100 relative to the general longitudinal direction of the two reach bar tubes and the operatively angular disposition of the two clamping slides 50, 51 are such that a very substantial pressure may be exerted to effect the press fit desired without a resulting localized or internal stressing of the tubular members.

In Fig. 6 it will be noted that the apparatus for effecting forward sub-assembly of the girl's type frame is simplified insofar as the application of the press fitting forces is concerned and but one pressure slide 120 serves to act upon the two reach bar tubes 50, 51 and but one clamping slide 121 need be used inasmuch as the application of the pressure forces applied to the two reach bar tubes is more near to a parallel relationship. Other parts are the same or so similar to mechanisms already described as to need no repetition.

In Figs. 11 to 14 inclusive, the same general arrangement of clamping slides and pressure heads is shown as being adapted to the pressure assembly of a pre-formed lower rear fork member 130 and a pre-formed upper rear fork member 131 with branches or lugs formed on a rear axle plate member of yoke 132. These frame members are indicated by dot and dash lines. Plate 132 is supported in a substantially flat or horizontal position on a clamping block 133 secured to the bed 134 of the machine. Clamping member 136 engages the top face of the plate 132 to hold it in clamped relation to an abutting thrust plate 137 fixed to block 133. This thrust plate has thrust surfaces contoured to the edge shape of the rear of the plate 132. Associated with the block 133 are guide blocks 138 provided with tube guiding surfaces disposed beneath the tube engaging lugs 132a, 132b of plate 132. Clamp 136 is operated by a manual lever 139 in the manner generally hereinbefore described. In Fig. 15 the relative position of the three frame parts to be assembled is illustrated before assembling pressure has been exerted thereon.

The apparatus includes a clamping mechanism to firmly clamp the plate member 132 to the fixed clamping block 133. The fixture (as shown) is for effecting the assembly of the right side tubular member of the upper rear fork structure and the right side tubular member of the lower rear fork structure. To form the left-hand side assembly the position of the reach bar tubes, as well as the shape of the plate member 132, will be reversed and the mechanisms adapted accordingly. It will be seen that fork tube 131 is positioned in a slidable clamp mechanism comprising slide block 140 disposed in slideway gibs 141, 142 and is held in a semi-cylindrical channel conforming to the shape of the tube. The tube is held in the channel of the block by an adjustable clamping member 145. Clamping member 145 is shiftable and lockable by a manually operable lever 146 in the manner generally hereinbefore described. A pressure slide 150 is connected to a piston rod 151 operated by a double action piston disposed in a hydraulic cylinder 152, generally in the manner hereinbefore described. This mechanism is duplicated for the lower rear fork member 131 and the disposition of the two mechanisms relative to the axial plate member 132 is such that the pressure shifting of the flattened ends of the tubular fork members relative to the lugs 132a and 132b formed on the plate member 132 will be parallel relative to the surfaces of the lugs.

No apparatus for the center mast tube assembly is shown, but the same may comprise a clamping mechanism similar to the head tube clamping and gauging means shown in Fig. 1 and a clamping slide for press fitting the lower end of the center mast tube into its corresponding opening formed in the double wall of the hanger housing tube. The branched cluster may be press fitted along the mast tube to the desired position by a slidable clamping mechanism and the respective mechanisms may be effective to produce the center mast sub-assembly with the center line of the hanger housing properly disposed relative to the center lines of the branches of the cluster member.

The final assembly of the sub-assemblies above described is effected by fixedly supporting the center mast assembly through the use of a gauging means extending into both ends of the hanger housing and with associated clamping means and, further, by the use of clamping means which firmly engages the cluster portion of the center mast assembly. The front sub-assembly and the two rear sub-assemblies are then positioned with the free ends of the smaller tubular elements thereof substantially in alignment with the openings in the branches of the cluster member and the openings in the tubular wall of the hanger housing member. While maintaining this relationship, compression forces are applied to the head end of the front assembly and the rear ends or plates of the two rear fork assemblies so that the free ends of the smaller tubes of the respective assemblies are shifted toward each other and into the openings in the cluster and hanger housing. This operation is effected by applying forces in a general longitudinal direction relative to the smaller tubes of these assemblies in substantially precision relation to the respective openings into which they are to be press fitted. Means are provided for gauging the longitudinal movement of the ends of the smaller tubes after entrance thereof into the openings of the center mast assembly so that a proper relation of the smaller tube ends to the front housing, to the hanger housing, to the seat post cluster and to the rear axle plates may always be obtained regardless of variations in the resistance encountered at one tubular joining point relative to another. The result is an overall accuracy of the disposition of the hanger housing relative to the front housing or head and the rear axle plates without any undue localized strain of any of the tubular members and jointures comprising the preassembled frame. A final locking is effected between one of the front reach bar ends and the center mast cluster in addition to the press fitted connection therebetween. Mechanism for carrying out the above outlined method of final assembly comprises the hydraulically operated final assembly machine shown in Figs. 18 to 44 inclusive, of the drawings.

Figs. 16 and 17 comprise more or less diagrammatic representations of the pre-assemblies comprising a boys' and a girls' type bicycle frame. As stated hereinbefore, the center mast assembly is effected by mechanism not disclosed herein. This center mast assembly comprises a hanger housing tube 160, a main or center mast tube 161, a four-branch cluster or tube-joining means 162 and a seat post supporting tube 163, as shown in Fig. 16, for the boys' frame. In the girls' frame, in lieu of the cluster 162, there are two clusters 164 and 165. These various hollow members are press fitted by any suitable means to accurately form the tubular center mast pre-assembly structure illustrated.

The final assembly machine for press fitting these four preliminary sub-assemblies together comprises a front gauging, clamping and guiding mechanism for the front sub-assembly, a gauging, guiding and clamping mechanism for the two rear sub-assemblies, and a gauging and clamping mechanism for rigidly positioning and holding the center mast pre-assembly. Hydraulic means is provided for effectively press fitting the six free ends of the tubular members, comprising the front and rear assemblies, into openings in the center mast assembly and means for separating the completely assembled frame from the mechanism after the frame has been press fitted and locked together, also is provided. The order of description of these various mechanisms will be followed hereinafter generally as outlined above. Associated with the respective slide mechanisms are cam operated tube stabilizers for preventing buckling or distortion of the curved tubes when longitudinal pressures are exerted thereon by the hydraulic means.

The front mechanism for receiving, gauging, clamping and shifting the front sub-assembly toward the fixed center mast assembly to press fit these two assemblies together is illustrated in Figs. 18, 22, 23, 25, 26, 27 and 32 of the drawings. This mechanism comprises slide structures operatively supported upon a heavy plate 170, forming the table or bed of the machine, and a supporting framework for the table is indicated generally in the drawings. The front slide mechanism supports two oppositely disposed pneumatic or hydraulic piston cylinder mechanisms 171 and 172 which operate oppositely disposed gauging plugs that fit into the open ends of the head or front housing tube 49. The slide mechanism, including the pneumatic or hydraulic cylinders 171 and 172 is shifted or operated as a unit by a hydraulic cylinder mechanism 174 and the controls therefor may be conveniently located on the top of bed 170. In Figs. 23, 25, 26 and 27 the side mechanism is shown as comprising a main slide structure 175, a base plate 176 supported by the table 170, slideways 177 and a carriage plate 178 secured to the slide structure. The carriage plate is reinforced to obtain stiffness by two spaced apart truss members 179 and 180, to which the hydraulic cylinders 171 and 172 are attached and disposed therebetween. Carriage plate 178 is provided with a further slideway structure comprising slide gibs 181 secured to the table 170 of the machine and which slidably engage stabilizer slide members 182 secured to the under side of plate 178 in operative relation to the members 181. The hydraulic piston cylinder mechanism 174 has a connecting rod 174a thereof connected to the slide structure 175 by a bracket 183 and a pin 184 extending through the bracket and a yoke-formed end of the piston rod 174a.

A third slide structure is provided comprising the slide member 198 placed above the plane of the table and operating upon blocks 199, which also form a support for the hydraulic cylinder mechanism 174 disposed therebetween. Gibs 200 are secured to the members 199 to complete the slideway structure. The forward end of the slide 198 comprises an integral bracket formation 198a which abuts and is secured to the truss member 180. The central region of the truss members is cut away, as shown in Fig. 26, to afford visibility and access to the operating position of a cradle member 188 secured to the carriage plate 178 and which is channeled to receive the front housing 49 and attached tubes, 51—53. The channel formation will vary for a boy's type or girl's type frame.

Retractable gauging plugs 189 and 190 are carried by slide members 191 and 192, respectively, and which operate in slideways 193 disposed at opposite ends of the cradle member 188. The shapes of the gauging plugs 189 and 190 are such as to engage the ends of the head tube 49 to center it and also to serve as stops for limiting the inward movement of the ends of the reach bar tubes 52 and 53 when pressure is exerted generally longitudinally upon the tubes. The relationship of these plugs relative to the tube ends is a duplication substantially of that shown in Fig. 1A. Slide members 191 and 192, carrying these gauging plugs, may be connected to the hydraulic connecting mechanisms 171 and 172 by any convenient means, such as pivotal pin connections 194—195 respectively. In Fig. 25 the adaptation of the mechanism described for both boys' and girls' type of frame assembly is indicated by the dot and dash lines and reference numerals 52 and 53. It will be seen that the mechanism above described comprises in effect four slide structures which afford very substantial operative stability to the mechanism or fixture for clamping, gauging and shifting the front sub-assembly of the frame into press fitting relation to the center mast assembly.

Associated with the slide mechanism described and immediately adjacent tube 52 (boys' type), is a tube guiding and stabilizing means disposed to react longitudinally along the curved upper reach bar 52 whereby the reach bar will be prevented from being distorted under the press fitting forces required to effect the press fitting assembly. This mechanism is shown in Figs. 19 and 32 and comprises a shiftable shoe member 205 having a vertically extending surface to tangentially conform substantially to the curved shape of the upper reach bar 52. This shoe member is carried by an arm or bracket 206 secured to the forward truss member 179. The bracket 206 is provided with a slide formation 206a which is supported by a base block 207 secured to the table 170 of the machine and the slide reacts against a slide gib 208 carried by the block 207. A fixed block 209 serves to support the under side of the reach bar tube 52. The top region of the tube is stabilized by a retractable bearing member 210 carried by a slide bar 211, shiftable into and out of operative position by a manually operated lever 212. The lever 212 is pivotally mounted on a pin 213 carried by a bracket structure 214 secured to the block structure 207—209. Thus, as the front sub-assembly is shifted toward the center mast assembly and under compressive stresses, tube 52 is supported along its path of movement along three lines about 90° apart. When it is desired to remove the completed frame from the machine the upper bearing or thrust member 210 can be retracted out of the way by operation of the lever 212 in an obvious manner.

The means for gauging the center mast assembly in the machine comprises a pneumatically or hydraulically operated gauging plug 219 adapted to fit into the upper open end of the housing tube 160 and cooperate with a second gauging plug 215 secured to the table. Gauging means are associated with the hanger housing clamping means for guiding the free ends of the two lower rear fork tubes to openings in the hanger housing and also for guiding the lower free end of the front reach bar 53 to a corresponding opening formed in the hanger housing. This center mast holding mechanism also includes a gauging and clamping means for clamping the cluster structure 162 of the center mast assembly, in the case of a boys' bicycle frame, and the cluster structures 164 and 165 in the case of a girls' type frame. Associated with the upper cluster clamping means is a removable spacing bar insertable between and retractable from a position between the two upper rear fork members. A similar mechanism acts between the two lower rear fork tubes. All of these mechanisms are such as to be swung or shifted clear of the completed frame for the ready extraction of the frame from the machine when the press fitted assembly has been completed. The mechanism for gauging and clamping the hanger housing is best shown in Figs. 18, 24, 36, 37, 38, 39 and 40.

With reference to Fig. 39, the bottom gauging plug 215 is shown supported by a block member 216 secured to a plate 217 supported upon the top surface of the machine table 170. The upper gauging plug 219 is mounted upon a shiftable block 220 secured to a slide 221 operated in a slideway structure 222 formed on a vertically extending bracket 223 secured to plate member 217. The slide structure 220—221 and the upper gauging plug 219, operatively supported thereby, is actuated by a pneumatic or hydraulic piston-cylinder mechanism 225 through a link member 226 pivotally connected by pin 227 to the piston rod 228. The link 226 operates a lever member 229 which is pivotally supported at 230 by a bracket member 231 mounted on the upper part of the slide bracket 223. The inner end of lever member 229 is pivotally connected at 231 to link member 232 which is pivotally connected at 233 to the slide block 220. The cylinder 225 may be attached to the side of the machine frame in any convenient manner and the controls therefor may be conveniently located on bed 170. The formation of the gauging plugs 215—219 are such that the inserted parts thereof serve as stops for the ends of the tubular members being forced into the hanger housing somewhat after the manner of the plugs shown in Fig. 1A. Upon completion of the assembly the upper gauging plug 219 may be shifted upwardly a substantial distance by operation of the hydraulic mechanism described to permit upward shifting of the hanger housing and the associated press fitted tubing for the purpose of ready removal of the frame from the machine. Associated with the mounting for the lower gauging plug 215 are extracting or stripper pins 430 and the manner of operation thereof will be described hereinafter.

Associated with the hanger housing gauging and clamping means is a guide block 235 secured to the plate member 217 which has a channel formed therein for the purpose of guiding the free end of the lower reach bar 53 into the corresponding opening formed in the hanger housing tube 160. This channel formation is closed by a pad 236 mounted upon or comprising a part of the slide block 220. A similar guide block 238 is disposed on the opposite side of the hanger housing position, note Figs. 36 and 38, and is provided with a channel shaped guideway to generally conform to the shape of the lower rear fork tubes 130. A shaped pad 239 carried by the slide block 220 serves to close the channel. A retractable positioning and gauging bar 240 operates in an opening formed in the block 238 to gauge the spacing between the fork tube ends 130 when being pressed into the hanger housing openings. The bar 240 may be operated manually. Pad 239, also carried by slide mechanism 220, closes the channel in block 238. The bar 240 (see Fig. 37) may also be operated by a link mechanism comprising a lever member 245 pivotally mounted at 246 on a bracket 247 secured to mast slide bracket 223. Lever 245 is pivotally connected at 248 to a link member 249 pivotally connected at 250 at its opposite end to the slide formation 220. Upward movement of the slide 220 causes the link mechanism to be shifted to the dotted line position shown in Fig. 37, effecting retraction of the bar 240 from between the lower rear fork tubes 130.

The means for gauging the upper portion of the center mast assembly is best shown in Figs. 18, 19, 35, 35A, 35B and 35C. Referring to Fig. 35, a gauging block 260 is provided with gauging channels conforming in shape to the external surfaces of the cluster structure 162 for both boys' and girls' type of frame. This mechanism has associated therewith a nibbing means somewhat in the form of a center punch mechanism for indenting a branch wall of the cluster and the inserted end of the upper front reach bar tube, as will be more fully set forth. This nibbing mechanism is duplicated at a second center mast cluster position for the girls' type of frame and a common actuating means is provided for operating both punches. A second or intermediate cluster clamping means is provided on the machine for receiving and clamping the second cluster of the girls' type of frame.

Again referring to Figs. 35, 35A and 35B, it will be noted that the block 260 has associated therewith an adjustable clamping pad 261 carried on an arm 262 which is pivotally supported at 263 by a bracket 264 secured to a spacer block 265 supported by the table 170 of the machine. The arm 262 is connected intermediate its ends to a link 266 pivoted at 267 to an over-center swinging lever member 268 pivotally connected at 269 to the bracket 264. This clamping means is swingable upwardly and outwardly away from the frame cluster so that the assembled frame may be readily removed from the machine and the disposition is such that the clamping pad 261 will clamp the cluster 162 firmly in the channel formation of the block 260. Associated with the cluster clamping mechanism just described are right and left-hand tube guiding means comprising channeled blocks for guiding the free ends of the two upper rear fork tubes 131 and the free end of the upper front reach bar tube 52 into the respective branches of the closure structure 162. In Fig. 35C, block 273 is shown as being provided with a channel 274 shaped to receive and guide the upper rear fork tubes 131 to the two receiving branches of the cluster 162. This channel is closed at the top by a shiftable plate 275 bifurcated at one side and hinged at 276 to a lug 277 formed on the block 273. Opposite to the hinge structure 276—277, as viewed in Fig. 35, is a swingable locking knob 278 in threaded engagement with a swingable stud 279 pivotally connected to the block 273 which swings into and out of a slot 280 formed in an end of the plate 275. Thus, the plate 275 can be swung about hinge 276 upwardly and outwardly to permit removal of the assembled frame.

Associated with the guide block 273 is a retractable spacer bar 282 (see Fig. 35C), which is disposed to slide in an opening formed in the block 273 and have the tapered or wedge shaped inner end thereof extend between the ends of the two fork tube members 131 and thereby accurately determine the spacing therebetween at the time the tubes are being press fitted into their respective branches of the cluster structure 162. Bar 282 may be shifted inwardly and outwardly in any convenient manner, such as by a manually operated lever 284 pivotally supported by a bracket 283, the end of the bar 282 being bifurcated to afford a pin connection between the bar 282 and the lever 284.

For guiding the free end of the upper front reach bar, a channel block 285 is provided, which channel is closed by swingable plate 286 after the manner of operation of the plate 275 for completing the guiding means for the upper front reach bar tube 52.

For the girls' type frame a second mast cluster clamping means and a tube guiding means are provided, generally indicated by the reference numeral 300 in Fig. 18, for clamping the second cluster structure and upper front reach bar, and the construction thereof may be generally as above described with reference to the clamping member 261 and front reach bar guiding means 285—286. The mechanism 300 comprises generally a channeled block 301, hinged plate 302 and manual locking knob 303. Disposed forwardly of the center mast tube position is a cluster clamping member 304 which may be operated in the manner of the clamping member 261.

The mechanism for receiving, supporting and forcefully shifting the two rear fork assemblies comprises generally clamping means separately engaging each of the rear axle plates of the two rear sub-assemblies. These clamping mechanisms are carried on a hydraulically shiftable slide mechanism. The slide mechanism carries tube supporting and guiding arms pivotally connected with the slide mechanism and controlled in their tube guiding movements by cam members fixed to the table of the machine. This mechanism is shown in Figs. 19, 20, 21, 33 and 34.

In Figs. 19 and 20 a main slide member 310 is shown as being operable in a slideway structure comprising a bottom plate 311 and slideway gibs 312 secured to the bed 170 by bolts 313. The forward end 310a of the slide structure is narrowed to have a stabilizing slide formation operable in slideways or gibs 314 secured to the plate 311 and the machine table by bolts. The slide member 310 carries clamping anvils or clamping block mechanisms comprising an upper gauging and clamp plate 318 and a lower gauging and clamp plate 319. The upper surfaces of these plates are contoured or recessed to conform generally to the edge contour of the rear axle plates 132. The upper plate 318 is supported in spaced relation to the lower plate 319 by a bracket structure comprising two spaced members 320. The upper surfaces of these clamp plates 318 and 319 are disposed in planes located substantially equidistantly above and below the common plane of the center lines of the center mast assembly and the tubes of the front sub-assembly when present in the machine. An upper locking or clamping member 321 is supported by an arm 322 in clamping relation to the upper plate 132 and is rockably carried on a bolt or stud member 323 supported by the clamping plate 318. The clamping lever 322 is operated by a cam member 325 fixed to a stud shaft 326 journalled in the bracket members 320. Also fixed to the stud shaft 326 is a manually operated lever 327 whereby when cam 325 is caused to wedge up against the under side of the clamping lever 322 an effective clamping of the rear axle plate and associated tubing by the clamping member 321 is obtained. A lower stud shaft 330 and manually operated lever 331 comprises a duplication of the upper clamping means just described. Operation of a lower clamping member 321a upon the lower axle plate 132 and associated tube assembly completes the alignment of the two rear axle plates. It will be noted that the bracket plates 320 serve as guiding means for the two rockable clamping levers 322 and 322a, which are urged normally upwardly by spring members 334. Leaf spring members 335 tend to cant the clamping levers 322—322a when the cam members 325 are swung to a lowered position, thus affording considerable clearance between the clamping blocks 321 and 321a and the respective gauging plates 318—319 for removal of the frame when completed. To operate the slide 310 a hydraulic piston-cylinder arrangement 340 is provided which may be secured to the top of the table bed 170 of the machine and the piston rod 341 thereof is pivotally connected at 342 to a bracket 343 secured to and spanning the ends of the bracket members 320.

Referring particularly to Figs. 19, 21, 33 and 34, it will be seen that means, carried by the slide mechanism 310, is provided for the supporting and the guiding of the two pairs of rear fork members or tubes in addition to the clamping and gauging mechanism. This tube guiding means comprises levers 350 and 351 pivotally supported at 352 and 353 at the sides of the bracket plates 320 by bracket members 354 and located substantially equidistant between the clamping surfaces of the clamping plates 318—319. Lever members 350—351 carry guiding shoes 355—356, which are shaped to embrace the upper and lower fork tubes and determine the outward spacing of the tubes. These shoes are carried by rockable brackets 357 and 358, respectively on pivot pins 359 carried by the free ends of the lever members 350—351. Mounted upon the lever members 350—351, between the outer free ends thereof, are cam rollers 360 and 361, respectively. These cam rollers ride upon cam members 363—364, supported by bracket structures 365 secured to the table top 170 of the machine. Spring member 370 is attached to the bracket structure 365 and to the lever 350 to maintain the lever 350 with the roller 360 in contact with the cam at all times. A like spring 371 maintains roller 361 in contact with cam 364.

It will be seen that the mechanism just described is adaptable for the reception, gauging, clamping and movement of the two rear fork assemblies, each comprising an upper and a lower rear fork member previously press fitted to a rear axle plate. The shapes of the cams 363 and 364 are so arranged as to cause the shoe members 355, 356 to firmly support the upper and lower spaced apart fork tubes as the ends of these tubes are being moved along and through the channels formed in the guide blocks 238, 273 so that sidewise deflection of the tube members is prevented during the press fitting operation of the tube ends into the cluster structures and the hanger housing openings of the center mast cluster assembly.

It will be noted that the channels of the various tube end guiding mechanisms are shaped to converge precisely to the six respective socket openings of the rigidly held center mast assembly and that the tube ends regardless of their particular direction of movement by the slide movements, must follow the center lines of the sockets or openings during the press fitting action.

In Figs. 28, 29, 30 and 31 the means for effecting a locking together of the upper front reach bar tube and a branch of the center mast cluster assembly is shown. This mechanism comprises nibbing punches 380—381, the tool 380 being effective during assembly of the boys' type frame, while the tool 381 is effective during assembly of the girls' type frame. These tools are disposed to extend through openings formed in the guide blocks 260 and 301 and are blunt pointed to nib or distort and indent a portion of the wall of a branch of the cluster into the wall of the end of the front reach bar tube in both the boys' and girls' type of frame. The tools 380—381 may be carried by a slide member 383 and the slide member 383 comprises a built-up structure operable in slideway members 385—386, supported by a spacer plate 387 which rests upon the machine bed plate 170. Disposed between the slideway members 385—386 is a compression spring 388 disposed to react against a lug 383a depending from the slide 383, the other end of the spring abutting the slideway 386. The spring serves to shift the slide and the nibbing tools carried thereby away from the frame clusters. The slide 383 is operated in a work performing direction by a cam 390, held in position relative to the slide structure by an L-shaped slideway member 391, which is secured to the spacer block 387 on opposite sides of the slideway structure for the slide 383. Cam 390 comprises a bar formation 390a extending toward, and secured to, the slide 310 which carries the rear fork clamping mechanisms. A bracket 392 on the slide member 310 affords rigid connection between slide 310 and cam 390a. It will be seen that the nibbing or locking action of the tools 380—381 will be effected during the latter part of the forward movement of the slide 310, the front edges of the frame having been moved partially into press fitting engagement with the center mast cluster structures and hanger housing prior to the completion of this last mentioned operation.

In Figs. 41 and 42 a source of hydraulic power for operating the various systems hereinbefore referred to is generally shown as comprising a hydraulic pump and fluid reservoir mechanism, indicated by the reference numeral 400, the pump being driven by a motor 401. A valving mechanism, generally indicated by the reference numeral 402, is operated by the controller mechanism generally indicated by the reference numeral 403, positioned on the top of the machine bed 170, there being controller rods 404 extending downwardly to the valve mechanisms 402 whereby hydraulic pressure may be transmitted from the pump to hydraulic cylinder 174 and cylinder 340 in the sequence named and in sequential relation with the various manual operations hereinbefore described. There are two controller rods, each one operating a reversible valve mechanism so that hydraulic pressure may be used to operate the piston-cylinder mechanisms 174 and 340 in both directions.

In Fig. 41 a second hydraulic unit 440 is indicated as being driven by a second motor 441, there being the valving mechanism 442 controlled in the manner hereinbefore described with reference to valving mechanism 403. This hydraulic unit may be connected to piston-cylinder mechanisms 171, 172 and 225 for operating the front head and hanger housing tube gauging and clamping mechanisms in an obvious manner (not shown).

The mechanism for stripping the assembled frame from the machine and the various clamping and gauging fixtures thereof comprises a piston-cylinder mechanism 420, (see Figs. 43 and 44) supported by a beam member 421, which beam member is secured to hollow columns 422—423. These columns rest upon and are secured to a cross-structure 424 forming part of the machine frame. The piston rod of the piston-cylinder mechanism 420 is connected to an elevatable plate structure 425, upon which rest pin members located immediately beneath the hanger housing perimeter and the center mast cluster structure positioned in the machine. The pins extend through the various clamping mechanisms acting upon these parts of the bicycle frame. For example, disposed immediately beneath the lower perimeter of the hanger housing tube are four pin members 430 equi-angularly spaced and of such length as to extend upwardly through the lower part of the hanger housing clamping mechanism to engage the lower edge or perimeter of the housing tube. A pin 431 is likewise provided to extend upwardly and terminate immediately beneath the cluster structure 165 of the girls' type frame and pin 432 is similarly provided to extend upwardly and terminate just beneath the cluster structure 162 of the boys' type frame. Thus, elevation of the plate 426 by the mechanism shown will serve to strip the completely assembled frame out of the various gauging blocks and fixtures comprising the machine, all of these fixtures being first conditioned of course to permit a free upward movement of the frame. The stripper mechanisms may be operated hydraulically or pneumatically, as desired.

The operation of the machine is as follows. Clamping block 10 for clamping the head tube 49 is swung out of position by shifting its supporting lever 11 to a position 90 degrees from that shown in Fig. 22. The guide bar 211 is shifted by manually operated lever 212 to its retracted position to the right in Fig. 32. The two head tube gauging plugs 189 and 190 are shifted to their outermost position by operation of the pneumatic piston-cylinder mechanisms. The hydraulic piston-cylinder mechanism 174a is shifted to the outermost position to the right in Figs. 18 and 25. The channel of the guide block 285 is opened by having its hinged closure member 286 swung to open position. The guide blocks 235—238 are open by having the hanger housing clamping slide 220 and the guide closure blocks 236—239 thereon in up position. Thus, the forepart of the machine is conditioned to receive a boy's type sub-assembly comprising the head tube 49 and the two forward reach bars 52—53. The rear clamping mechanisms on slide 310 (Figs. 19 and 20) are in a retracted position to the left of Figs. 19 and 20. Gauging plugs 189—190 are then pneumatically shifted toward each other to fit into the ends of the head tube 49, the inner configurations thereof being such as to act as spacing abutments for the head ends of the tubes 52—53. Clamping lever 11 is then swung about its pivotal mounting to bring clamping block 10 over the head tube 49 whereupon camming lever 12 is manually shifted upwardly to cause its cams 13 to firmly compress clamping block 10 on the head tube 49. This clamp may be omitted when pre-assembly accuracy is available. The hinged guide closure member 286 is then swung to close the channel in guide block 285 where it is secured in non-clamping relation to tube 52. The retractable member 211 is then shifted over tube 52 to the position shown in full lines in Fig. 32. The forward sub-assembly of the frame is then conditioned to be acted upon by the hydraulic slide mechanism 174—174a. The center mast assembly previously has been or now can be positioned in the gauging block 215. The clamping lever 262 (see Figs. 35 and 35A) is then operated as described to bring clamping block 261 upon center mast cluster member 162.

The two rear sub-assemblies are then positioned with the rear axle plates 132 thereof on the contoured clamping blocks 318—319 with the forward free ends of the tubes 130—131 disposed in the channels of the guide blocks 273 and 238. The levers 327 and 331 (see Fig. 20) are then swung clockwise to cause clamping blocks 321 and 321a to firmly clamp the rear axle plates 132 on the respective blocks 318 and 319. The channel of guiding block 273 may then be closed by the hinged closure member 275 (see Fig. 35C) whereupon the spacer bar 282 is shifted inwardly to space the free ends of the two upper rear fork tubes relative to the rear branches of the cluster structure 162. The hanger housing is then gauged and clamped through lowering of the clamping slide 220 by pneumatic operation, and by this same action spacer bar 240 is shifted inwardly to space the free ends of the lower rear fork members 131 (note Fig. 38) relative to the radial apertures formed in the hanger housing tube 160. Lowering the slide likewise effects the closing of the channels of the guide blocks 235—238 as explained.

The head tube assembly is then shifted toward the apertures of the center mast cluster 162 and hanger housing 160 by hydraulic operation of slide 198 in the manner described, whereupon the channel guide blocks 235—285 guide the tube into the said apertures in an accurate manner during this press fitting action. The curved tube 52 slides along the top surface of the fixed block 209 and the curvature thereof is followed by the vertical surface of the member 205 by reason of the action of the slide operating member 206, which is fixed to and shiftable with the cross-slide structure carrying the head tube end of the front sub-assembly. The hydraulic press fitting of the ends of the tubes 52—53 to the cluster and hanger housing structure, respectively, continues until the ends of these tubes abut the cylindrical wall of the center mast tube and the guaging surfaces of the plugs 215—219 so that the general longitudinal over-all positions of the tubes 52—53 relative to the final frame assembly will always be substantially predetermined.

The rear hydraulic mechanism 341 is then operated to cause the clamp carrying slide 310 to shift toward the center mast assembly position, thus causing the ends of the upper fork tubes 131 to be moved along the channel of guide block 273 while being subject to the spacing and guiding influence of the spacing and guiding bar 282. In like manner the lower tube ends 130 are guided into the channel block 238, subject to the spacing and guiding influence of slide bar 240 so that the ends of these respective pairs of bars or tubes are accurately presented to the apertures of the branches of the cluster 162 and to the apertures formed in the hanger housing tube 160. Continued operation of the slide 310 advances the tube ends until the ends of the lower tubes 130 encounter the gauging blocks 215—219 in the hanger housing and resistance to the hydraulic pressure stops operation of this mechanism. In the meantime the stabilizing shoes 355—356 are caused to follow the movement of the respective pairs of bars to stabilize these bars and prevent lateral buckling when the same are subjected to compression forces by action of hydraulic cylinder mechanism 340.

The action of slide 310 in the press fitting direction operates cam member 390a to cause the indenting tool 380 to form an indentation in the wall of that branch of the cluster 162 which receives the end of the tube 52, thus mechanically effecting a lock between the branch and tube 52.

The hydraulic pressure is released in the cylinders 174 and 340; the various clamping and gauging mechanisms are then opened; the bars 282, 240 and 211 are retracted; and the pneumatic clamping mechanisms for the head tube and hanger housing tube are then shifted to open position. The rear hydraulic cylinder mechanism 340 is then reversed by operation of the controls to retract the slide 310. The completely assembled frame is now conditioned for removal.

The stripping mechanism, comprising the plate 426 and pins 430, 431 and 432, is then operated by the piston-cylinder mechanism 420 to lift the plate 426, thus causing the upper ends of the pins to act upon the lower perimeter of the hanger housing tube and the under side of the center mast cluster structure to elevate the entire frame whereupon the frame can be shifted endwise to move the head tube end of the frame free of the cross-slide structure. The cross-slide structure may then be retracted by hydraulic operation of the same and the mechanism is then conditioned for the reception of another frame assembly.

The foregoing operation is described with reference to a boy's type bicycle frame. The operation is the same for a girl's type frame with the exception that the additional clamping means 300 for the second cluster structure involved in the girl's type frame is utilized and the second indenting tool 381 serves to effect a mechanical lock between the branch of the second cluster structure and the upper reach bar end.

It is to be understood that while we have disclosed a complete mechanism for carrying out the various steps of our method of effecting a complete press fitting assembly of all of the tubular members of the velocipede frame structure, the various novel features incorporated in the complete machine which effects this final assembly may be separately utilized without departing from the essential features of our invention. Also, the order of inserting and clamping the sub-assemblies may be varied, the only sequential requirement on the operation being that the front sub-assembly be press fitted to the center mast assembly before the rear slide mechanism 310 is operated.

We claim:

1. In a tubular bicycle frame assembling apparatus, a machine bed; a holding fixture means on the bed adapted to receive and rigidly clamp a tubular center mast sub-assembly comprising a center mast tube attached to an apertured hanger housing tube and a branched cluster fitted upon the center tube; a carriage on the machine adapted to receive and clamp a front tubular sub-assembly comprising a head tube and upper and lower tubular front reach bars fitted to the head tube; a second carriage on the machine adapted to receive and clamp two rear fork sub-assemblies in spaced relation to the plane of the center lines of the center mast tube and the head tube, tube end guiding means associated with the center mast holding fixture means comprising tube end guiding channels shaped to guide simultaneously free tube ends of the front and rear sub-assemblies to apertures in the hanger housing and to the cluster branches; means for shifting the carriages and the sub-assemblies thereby toward the fixed center mast assembly; and a plurality of tube stabilizing means, each of said stabilizing means comprising a camming block fixed to the machine bed, and in contact with said camming block, an arm connected to and extending from one of said carriages to support one of the curved tubular members of said sub-assemblies, said camming block being shaped to maintain said arm against the curved tubular member as the sub-assembly is advanced by the carriage.

2. In a tubular bicycle frame assembling apparatus, a machine bed; a holding fixture means on the bed adapted to receive and rigidly clamp a tubular center mast sub-assembly comprising a center mast tube attached to an obliquely apertured hanger housing tube and an obliquely branched cluster fitted upon the center tube; a carriage on the machine adapted to receive and clamp the head tube of a front tubular sub-assembly comprising a head tube and upper and lower tubular front reach bars fitted to the head tube; a second carriage on the machine adapted to receive and clamp two rear fork sub-assemblies in substantially equidistant spacing relative to the plane of the center lines of the center mast tube and the head tube; tube end guiding means associated with the center mast holding fixture means comprising tube end guiding channels shaped to guide free tube ends of the front and rear sub-assemblies to apertures in the hanger housing and to the cluster branches; means for independently shifting the carriages toward and from the fixed center mast assembly; gauging means associated with said holding fixture means and adapted to fit into the hanger housing ends when clamped for limiting the endwise movement of the tube ends being fitted thereinto by the movement of the carriages; and a plurality of tube stabilizing means, each of said stabilizing means comprising a camming block fixed to the machine bed, and in contact with said camming block, an arm connected to and extending from one of said carriages to support one of the curved tubular members of said sub-assemblies, said camming block being shaped to maintain said arm against the curved tubular member as the sub-assembly is advanced by the carriage.

3. In a tubular bicycle frame assembling apparatus, a machine bed; a holding fixture means on the bed adapted to receive and rigidly clamp a tubular center mast sub-assembly comprising a center mast tube attached to a hanger housing tube and a branched cluster fitted upon the center tube; a carriage on the machine adapted to receive and clamp the head tube of a front tubular sub-assembly comprising a head tube and upper and lower tubular front reach bars fitted to the head tube including a cross-slide structure operating gauging plugs adapted to enter the ends of the head tube; power means for operating the cross-slide structure; a second carriage on the machine adapted to separately receive and clamp two rear fork sub-assemblies in spaced relation to the plane of the center lines of the center mast tube and the head tube; tube end guiding means associated with the center mast holding fixture means comprising tube end guiding channels shaped to guide free tube ends of the front and rear sub-assemblies to apertures in the hanger housing and to the cluster branches; means for independently shifting the carriages and sub-assemblies carried thereby toward the fixed center mast assembly; gauging means associated with said holding fixture means and adapted to fit the hanger housing ends when clamped for limiting the endwise movement of the tube ends being fitted thereinto by the movement of the carriages; and a plurality of tube stabilizing means, each of said stabilizing means comprising a camming block fixed to the machine bed, and in contact with said camming block, an arm connected to and extending from one of said carriages to support one of the curved tubular members of said sub-assemblies, said camming block being shaped to maintain said arm against the curved tubular member as the sub-assembly is advanced by the carriage.

4. In a machine of the character described the combination of a machine bed, a supporting means fixed on the bed for rigidly clamping and supporting a laterally obliquely apertured tubular structure with the apertures thereof exposed; a carrier means movably mounted on the bed and adapted to engage curved tubular elements and to shift the curved tubular elements in a direction substantially longitudinally thereof; means interposed between said carrier means and said supporting means for guiding the ends of the tubular elements to the apertures of the rigidly clamped tubular structure; power means acting on the carrier for effecting a fitting connection of the ends of the tubular elements into the apertures of the rigidly clamped tubular structure; gauging plugs associated with said supporting means and insertable in the ends of said apertured tubular structure, said plugs being adapted to limit the movement of said curved tubular elements into the apertures of said apertured structure and to clamp the said apertured structure endwise; and tube deflection limiting means mounted between said supporting means and said carrier means along the side of said tubular elements, said deflection limiting means comprising a rigidly mounted structure having a vertical surface disposed toward, and limiting the sidewise deflection of, said curved tubular elements during said fitting action.

5. In a machine of the character described the combination of a machine bed, a supporting means on the bed for gauging and rigidly clamping an obliquely apertured tubular structure; a carrier means adapted to engage a second tubular structure and to carry the second tubular structure to the apertured structure; tube end guiding means associated with the supporting means comprising tube end guiding channels shaped to guide free ends of elements of the second tubular structure to apertures in the rigidly clamped tubular structure; power means acting on the carrier for effecting a press fitted connection of the ends of the elements of the second tubular structure into the apertures of the rigidly clamped tubular structure; and gauging plugs associated with said supporting means and insertable in the ends of said apertured tubular structure, said plugs being adapted to limit the movement of said second tubular structure into the apertures of said apertured structure and to clamp said apertured structure endwise.

HERMAN L. KRAEFT.
LEONARD J. WALTERS.
RUDOLPH F. SKERL.

REFERENCES CITED

The following references are of record in the file of this patent:

UNITED STATES PATENTS

| Number | Name | Date |
|---|---|---|
| 385,371 | Paterson | July 3, 1888 |
| 843,098 | Reiss | Feb. 5, 1907 |
| 1,054,557 | Jensenius | Feb. 25, 1913 |
| 1,501,129 | Meilselback | July 15, 1924 |
| 1,677,860 | Ferris | July 17, 1928 |
| 1,763,886 | Gold | June 17, 1930 |
| 1,996,170 | Padgett | Apr. 2, 1935 |
| 2,002,220 | Douglas | May 21, 1935 |
| 2,160,039 | Singer | May 30, 1939 |
| 2,225,292 | Andrews et al. | Dec. 17, 1940 |

FOREIGN PATENTS

| Number | Country | Date |
|---|---|---|
| 105,821 | Germany | Nov. 23, 1899 |